United States Patent
Zong

(10) Patent No.: US 11,330,069 B2
(45) Date of Patent: *May 10, 2022

(54) SERVICE SUBSCRIPTION METHOD AND SYSTEM FOR REPORTING SERVICE CHANGE IN COMMUNICATION SYSTEM

(71) Applicant: Huawei Technologies Co., Ltd., Shenzhen (CN)

(72) Inventor: Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/033,092

(22) Filed: Sep. 25, 2020

(65) Prior Publication Data

US 2021/0014322 A1  Jan. 14, 2021

Related U.S. Application Data

(63) Continuation of application No. 16/723,671, filed on Dec. 20, 2019, now Pat. No. 10,812,609, which is a (Continued)

(30) Foreign Application Priority Data

Apr. 9, 2018 (CN) .......................... 201810312964.8

(51) Int. Cl.
*H04L 29/08* (2006.01)
*H04L 67/55* (2022.01)
(Continued)

(52) U.S. Cl.
CPC .......... *H04L 67/26* (2013.01); *H04L 61/1552* (2013.01); *H04L 67/16* (2013.01)

(58) Field of Classification Search
CPC ...... H04L 67/26; H04L 61/1552; H04L 67/16
See application file for complete search history.

(56) References Cited

U.S. PATENT DOCUMENTS

| 9,848,366 B2 | 12/2017 | Xu et al. |
| 2010/0202403 A1 | 8/2010 | Premec |

(Continued)

FOREIGN PATENT DOCUMENTS

| CN | 101562578 A | 10/2009 |
| CN | 101803326 A | 8/2010 |

(Continued)

OTHER PUBLICATIONS

Huawei et al., "TS 23.502 OI#16 MSISDN Support", SA WG2 Meeting #123 S2-177833, Oct. 23-27, 2017, Ljubljana, Slovenia, Total 25 Pages.

(Continued)

*Primary Examiner* — Mohamed A. Wasel
(74) *Attorney, Agent, or Firm* — Conley Rose, P.C.

(57) ABSTRACT

A service subscription method for reporting service change in a communications system is provided. In the method, a first network function network element sends a first message to a second network function network element to subscribe a first service on behalf of a third network function network element. The first service is provided by the second network function network element and the first message includes a first address of the first network function network element. When the second network function network element is changed to a fourth network function network element, the fourth network function network element sends a third message to the first network function network element according to the first address to notify the first network function network element that a subscription of the first service has changed.

20 Claims, 7 Drawing Sheets

Related U.S. Application Data continuation of application No. PCT/CN2019/081849, filed on Apr. 9, 2019.

(51) Int. Cl.
*H04L 61/4552* (2022.01)
*H04L 67/51* (2022.01)

(56) References Cited

U.S. PATENT DOCUMENTS

| | | |
|---|---|---|
| 2011/0092186 A1 | 4/2011 | Krco et al. |
| 2013/0166762 A1 | 6/2013 | Jalan et al. |
| 2013/0176990 A1 | 7/2013 | Xu et al. |
| 2013/0208629 A1 | 8/2013 | Luo et al. |
| 2016/0020804 A1 | 1/2016 | Lee et al. |
| 2016/0029278 A1 | 1/2016 | Poikonen et al. |
| 2018/0324652 A1 | 11/2018 | Ryu et al. |
| 2019/0349744 A1 | 11/2019 | Zong et al. |
| 2020/0137182 A1 | 4/2020 | Zong |

FOREIGN PATENT DOCUMENTS

| | | |
|---|---|---|
| CN | 102057706 A | 5/2011 |
| CN | 102413493 A | 4/2012 |
| CN | 103516746 A | 1/2014 |
| CN | 104137491 A | 11/2014 |
| CN | 106538042 A | 3/2017 |
| CN | 110366144 A | 10/2019 |
| CN | 112188444 A | 1/2021 |
| WO | 2012051913 A1 | 4/2012 |
| WO | 2017078485 A1 | 5/2017 |
| WO | 2018035431 A1 | 2/2018 |

OTHER PUBLICATIONS

"3rd Generation Partnership Project; Technical Specification Group Services and System Aspects; Procedures for the 5G System; Stage 2 (Release 15)," 3GPP TS 23.502, V15.1.0, Mar. 2018, 285 pages.

Intel, "Clarification on AMF behaviour due to Subscriber Data Change in UDM," S2-182717, SA WG2 Meeting #126, Feb. 26-Mar. 2, 2018, 4 pages.

"3rd Generation Partnership Project; Technical Specification Group Services and System Aspects; System Architecture for the 5G System; Stage 2 (Release 15)," 3GPP TS 23.501, V15.1.0, Mar. 2018, 201 pages.

ZTE, "TS23.502 Exposure of Mobility Events from AMF," 3GPP TSG SA WG2 #126, S2-182901, Feb. 26-Mar. 2, 2018, 7 pages.

SERVICE SUBSCRIPTION METHOD AND SYSTEM FOR REPORTING SERVICE CHANGE IN COMMUNICATION SYSTEM

CROSS-REFERENCE TO RELATED APPLICATIONS

This application is a continuation of U.S. patent application Ser. No. 16/723,671, filed on Dec. 20, 2019, which is a continuation of International Patent Application No. PCT/CN2019/081849, filed on Apr. 9, 2019, which claims priority to Chinese Patent Application No. 201810312964.8, filed on Apr. 9, 2018. All of the aforementioned patent applications are hereby incorporated by reference in their entireties.

TECHNICAL FIELD

This application relates to the field of communications technologies, and in particular, to a service subscription method and an apparatus.

BACKGROUND

A 5th generation (5G) system supports data connection and service enablement deployment. In the 5G system, network function network elements in a control plane may interact with each other on a service basis. A common service in services provided by the network function network elements is an event exposure service. A main implementation process of the service is as follows: When subscribing to a required service from a service provider, a service subscriber provides an event-receiving address to the service provider, and after determining that the required event to which the service subscriber subscribes can be provided, the service provider notifies the required event to the event-receiving address.

In practice, a service status or a service subscription (namely, a subscription attribute) changes after a user subscription, a network policy, a network capability, and the like change. For example, due to a change of a user subscription, an event that is originally authorized to be monitored cannot be monitored any more, and monitoring needs to be cancelled. Alternatively, due to a change of a network capability, an event that is originally authorized to be monitored cannot be monitored any more, and monitoring needs to be suspended. However, in an existing service subscription procedure, communication between devices in a case of a change of a service status or a service subscription is not improved, and a corresponding mechanism is not formulated to enable a service provider to report a service change to a service subscriber. Therefore, the service subscription procedure is imperfect, and the service subscription procedure may be interrupted.

SUMMARY

This application provides a service subscription method and an apparatus to propose a mechanism for reporting a service change.

According to a first aspect, this application provides a service subscription method, and the method includes: sending, by a first network function network element, a first message to a second network function network element, to subscribe to a first service for a third network function network element from the second network function network element, where the first message includes a first address; receiving, by the first network function network element, a third message using the first address; and learning, based on the third message, that the first service has changed, where the first address is an address of the first network function network element.

In this method, the first network function network element sends the address of the first network function network element to the second network function network element. Therefore, when the first service changes, the first network function network element may receive a notification that the service has changed. In this way, a mechanism for reporting a service change is improved, such that a service subscription procedure can be relatively perfect, and no interruption is caused.

In a possible design, before sending the first message to the second network function network element, the first network function network element receives a second message from the third network function network element, where the second message is used to subscribe to a second service, the second message includes a second address, and the second address is an address of the third network function network element. The method further includes determining, by the first network function network element based on the second service, the first service that needs to be subscribed to from the second network function network element, where the first message further includes the second address used by the second network function network element to provide the first service to the third network function network element.

In this method, the first network function network element may determine the first service based on the second message, such that the first service can be subscribed to from the second network function network element.

In a possible design, after learning, based on the third message, that the first service has changed, the first network function network element sends a fifth message to the second address of the third network function network element, where the fifth message is used to notify that the second service has changed. In this way, the third network function network element may learn that a service to which the third network function network element subscribes has changed.

In a possible design, the first message further includes instruction information, and the instruction information is used to instruct to receive, using the first address, a message notifying that the first service has changed. In this way, after detecting that the first service has changed, another network function network element sends, to the first address, the message indicating that the first service has changed.

In a possible design, after sending, by a first network function network element, a first message to a second network function network element, the method further includes receiving, by the first network function network element, a second subscription correlation identifier from the second network function network element, where the second subscription correlation identifier is an identifier allocated by the second network function network element to a subscription of the first service. The third message further includes the second subscription correlation identifier. The learning, by the first network function network element based on the third message, that the first service has changed includes learning, by the first network function network element based on the second subscription correlation identifier in the third message, that the first service has changed.

In this method, the first network function network element may accurately learn that the first service has changed.

In a possible design, after the first network function network element receives the second message from the third network function network element, the first network function network element allocates a first subscription correlation identifier to a subscription of the second service, and sends the first subscription correlation identifier to the third network function network element. Sending, by the first network function network element, the fifth message to the second address of the third network function network element includes sending, by the first network function network element, the fifth message including the first subscription correlation identifier to the second address of the third network function network element.

In a possible design, before sending, by a first network function network element, a first message to a second network function network element, the method further includes: allocating, by the first network function network element, a first notification correlation identifier; and sending, by a first network function network element, a first message to a second network function network element includes sending, by the first network function network element, the first message including the first notification correlation identifier to the second network function network element. The third message received by the first network function network element using the first address further includes the first notification correlation identifier. The learning, by the first network function network element based on the third message, that the first service has changed includes learning, by the first network function network element based on the first notification correlation identifier in the third message, that the first service has changed.

In this method, the first network function network element may accurately identify that the first service has changed.

In a possible design, the second message further includes a second notification correlation identifier, and the second notification correlation identifier is allocated by the third network function network element. Sending, by the first network function network element, the fifth message to the second address of the third network function network element includes sending, by the first network function network element, the fifth message including the second notification correlation identifier to the second address of the third network function network element.

In a possible design, that the first service has changed means that a status of the first service has changed and/or a subscription of the first service has changed. In a possible design, the subscription change includes a subscription correlation identifier change or an event reporting information change, and the event reporting information change includes any one or any combination of the following: a change of an event reporting mode, a change of a maximum quantity of event reports, or a change of maximum duration of event reporting.

In this method, a specific case in which the first service changes may be accurately determined.

In a possible design, when that the first service has changed means that the status has changed, the third message further includes first status information. The first status information is a paused state, a resumed state, a cancelled state, or a deleted state. In this way, the first network function network element may learn of a current status of a subscribed service.

In a possible design, the third message further includes an event identifier and/or a user identity corresponding to the first status information. In this way, the first network function network element may learn of a status change event or a user corresponding to a status change event.

In a possible design, when that the first service has changed means that the subscription has changed, the third message further includes a subscription attribute of a changed subscription of the first service. In this way, the first network function network element and the third network function network element may learn of a current subscription attribute of the subscribed service.

In a possible design, when the subscription change is a subscription correlation identifier change, the subscription attribute of the changed subscription of the first service is an updated subscription correlation identifier. In this way, the first network function network element and the third network function network element may accurately know a specific subscription attribute of the changed subscription.

In a possible design, when the subscription change is an event reporting information change, the subscription attribute of the changed subscription of the first service includes any one or any combination of the following: an updated event reporting mode, an updated maximum quantity of event reports, or updated maximum duration of event reporting. In this way, the first network function network element may accurately know a specific subscription attribute of the changed subscription.

In a possible design, receiving, by the first network function network element, a third message using the first address may be performed in the following two manners. In a first manner, the first network function network element receives the third message from the second network function network element using the first address. In a second manner, the first network function network element receives the third message from a fourth network function network element using the first address, where the second network function network element requests the first service for the third network function network element from the fourth network function network element.

In this method, the first network function network element may successfully receive, using the first address, the message notifying that the first service has changed.

In a possible design, the instruction information is a third event identifier set, where the third event identifier set includes a status change event identifier and/or a subscription change event identifier. In this way, another network function network element may be triggered by a specific event to detect whether the first service has changed.

In a possible design, the subscription change event identifier includes a subscription correlation identifier change event identifier or an event reporting information change event identifier. In this way, an event of detecting that the first service has changed may be accurately determined.

In a possible design, the third message further includes at least one event identifier in the third event identifier set. In this way, the first network function network element may identify a specific change of the first service.

According to a second aspect, an embodiment of this application provides a service subscription method, and the method includes: receiving, by a second network function network element, a first message from a first network function network element, where the first message is used by the first network function network element to subscribe to a first service for a third network function network element from the second network function network element, the first message includes a first address, and the first address is an address of the first network function network element; and sending, by the second network function network element, a third message to the first address of the first network function network element, to notify the first network function network element that the first service has changed.

In this method, the first network function network element sends the address of the first network function network element to the second network function network element. Therefore, when the first service changes, the first network function network element may receive a notification that the service has changed. In this way, a mechanism for reporting a service change is improved, such that a service subscription procedure can be relatively perfect, and no interruption is caused.

In a possible design, the first message further includes a second address, the second address is an address of the third network function network element, and the second network function network element provides the first service to the third network function network element based on the second address. In this way, when the first service is normal, the second network function network element may normally notify the third network function network element of a required event.

In a possible design, the first message further includes instruction information, and the instruction information is used to instruct to receive, using the first address, a message notifying that the first service has changed. In this way, after detecting that the first service has changed, the second network function network element sends, to the first address, the message indicating that the first service has changed.

In a possible design, after receiving the first message from the first network function network element, the second network function network element allocates a second subscription correlation identifier to a subscription of the first service. Sending, by the second network function network element, a third message to the first address of the first network function network element includes: adding, by the second network function network element, the second subscription correlation identifier to the third message; and sending the third message to the first address of the first network function network element. In this way, the first network function network element may learn, using the second subscription correlation identifier in the third message, that the first service has changed.

In a possible design, the first message further includes a first notification correlation identifier; and sending, by the second network function network element, a third message to the first address of the first network function network element includes sending, by the second network function network element, the third message including the first notification correlation identifier to the first address of the first network function network element. In this way, the first network function network element may learn, using the first notification correlation identifier in the third message, that the first service has changed.

In a possible design, that the first service has changed means that a status of the first service has changed and/or a subscription of the first service has changed. In a possible design, the subscription change includes a subscription correlation identifier change or an event reporting information change, and the event reporting information change includes any one or any combination of the following: a change of an event reporting mode, a change of a maximum quantity of event reports, or a change of maximum duration of event reporting.

In this method, a specific case in which the first service changes may be accurately determined.

In a possible design, when that the first service has changed means that the status has changed, the third message further includes first status information. The first status information is a paused state, a resumed state, a cancelled state, or a deleted state. In this way, the first network function network element may learn of a current status of a subscribed service.

In a possible design, the third message further includes an event identifier and/or a user identity corresponding to the first status information. In this way, the first network function network element may learn of a status change event or a user corresponding to a status change event.

In a possible design, when that the first service has changed means that the subscription has changed, the third message further includes a subscription attribute of a changed subscription of the first service. In this way, the first network function network element may learn of a current subscription attribute of the subscribed service.

In a possible design, when the subscription change is a subscription correlation identifier change, the subscription attribute of the changed subscription of the first service is an updated subscription correlation identifier. In this way, the first network function network element may accurately know a specific subscription attribute of the changed subscription.

In a possible design, when the subscription change is an event reporting information change, the subscription attribute of the changed subscription of the first service includes any one or any combination of the following: an updated event reporting mode, an updated maximum quantity of event reports, or updated maximum duration of event reporting. In this way, the first network function network element may accurately know a specific subscription attribute of the changed subscription.

In a possible design, the instruction information is a third event identifier set, where the third event identifier set includes a status change event identifier and/or a subscription change event identifier. In this way, the second network function network element may be triggered by a specific event to detect whether the first service has changed.

In a possible design, the subscription change event identifier includes a subscription correlation identifier change event identifier or an event reporting information change event identifier. In this way, the second network function network element may accurately determine an event of detecting that the first service has changed.

In a possible design, the third message further includes at least one event identifier in the third event identifier set. In this way, the first network function network element may identify a specific change of the first service.

In a possible design, the second network function network element requests the first service from a fourth network function network element, and sends the first address to the fourth network function network element. In this way, after a user equipment (UE) reselects the fourth network function network element because the UE moves, the fourth network function network element may send, to the first address, a message notifying that the first service has changed.

According to a third aspect, this application further provides a first network function network element, and the first network function network element has a function of implementing behavior of the first network function network element in the foregoing method embodiment. The function may be implemented by hardware or may be implemented by hardware executing corresponding software. The hardware or software includes one or more modules corresponding to the foregoing function.

In a possible design, a structure of the first network function network element includes a sending unit, a receiving unit, and a processing unit, and the units may perform corresponding functions in the foregoing method example.

For details, refer to detailed descriptions in the method example. Details are not described herein again.

In a possible design, the structure of the first network function network element includes a transceiver and a processor, and optionally further includes a memory. The transceiver is configured to receive and send data, and is configured to communicate and interact with another device in a communications system. The processor is configured to support the first network function network element in performing a corresponding function in the foregoing method. The memory is coupled to the processor, and the memory stores a program instruction and data that are necessary for the first network function network element.

According to a fourth aspect, this application further provides a second network function network element, and the second network function network element has a function of implementing behavior of the second network function network element in the foregoing method instance. The function may be implemented by hardware or may be implemented by hardware executing corresponding software. The hardware or software includes one or more modules corresponding to the foregoing function.

In a possible design, a structure of the second network function network element includes a receiving unit, a sending unit, and a processing unit, and the units may perform corresponding functions in the foregoing method example. For details, refer to detailed descriptions in the method example. Details are not described herein again.

In a possible design, the structure of the second network function network element includes a transceiver and a processor, and optionally further includes a memory. The transceiver is configured to receive and send data, and is configured to communicate and interact with another device in a communications system. The processor is configured to support the second network function network element in performing a corresponding function in the foregoing method. The memory is coupled to the processor, and the memory stores a program instruction and data that are necessary for the second network function network element.

According to a fifth aspect, this application further provides a system, where the system includes a first network function network element, and the first network function network element may be configured to perform the steps performed by the first network function network element in the first aspect and any method of the first aspect. In a possible design, the system may further include a second network function network element, and the second network function network element may be configured to perform the steps performed by the second network function network element in the first aspect and any method of the first aspect. In a possible design, the system may further include another device, such as a third network function network element, that interacts with the first network function network element and/or the second network function network element in the solution provided in this embodiment of this application.

According to a sixth aspect, this application further provides a system, where the system includes a second network function network element, and the second network function network element may be configured to perform the steps performed by the second network function network element in the second aspect and any method of the second aspect. In a possible design, the system may further include a first network function network element, and the first network function network element may be configured to perform the steps performed by the first network function network element in the second aspect and any method of the second aspect. In a possible design, the system may further include another device, such as a third network function network element, that interacts with the first network function network element and/or the second network function network element in the solution provided in this embodiment of this application.

According to a seventh aspect, this application further provides a computer storage medium, where the computer storage medium stores a computer executable instruction, and the computer executable instruction is used to cause a computer to perform any one of the foregoing methods when being invoked by the computer.

According to an eighth aspect, this application further provides a computer program product that includes an instruction. When the computer program product runs on a computer, the computer performs any one of the foregoing methods.

According to a ninth aspect, this application further provides a chip, where the chip is connected to a memory, and is configured to read and execute a program instruction stored in the memory, to implement any one of the foregoing methods.

DESCRIPTION OF EMBODIMENTS

Figure 1:
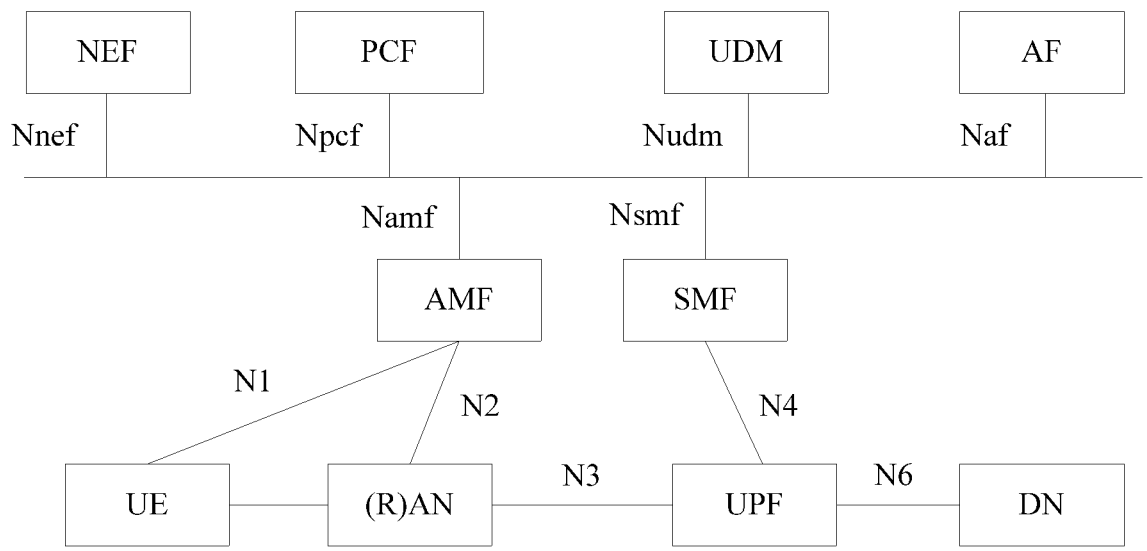
FIG. 1 is a schematic architectural diagram of a communications system according to this application.

The following further describes in detail this application with reference to accompanying drawings.

Embodiments of this application provide a service subscription method and an apparatus to propose a mechanism for reporting a service change. The method and the apparatus in this application are based on a same concept. Because problem resolving principles of the method and the apparatus are similar, mutual reference may be made to implementations of the apparatus and the method, and repeated parts are not described.

In the following, some terms in this application are described, in order to help a person skilled in the art have a better understanding.

(1) A first network function network element, a second network function network element, and a third network function network element are network function network elements in a control plane of a core network, support an event exposure service, and may perform communication and interaction based on the event exposure service. In the embodiments related to this application, the first network function network element subscribes to a service for the third network function network element from the second network function network element. The first network function network element may be but is not limited to a data management network element, a policy control function network element, or the like. For example, the data management network element may be a unified data management (UDM), and the policy control function network element may be a policy control function (PCF). The second network function network element may be but is not limited to a core-network access and mobility management function network element, a session management function network element, or the like. For example, the core-network access and mobility management function network element may be a core access and mobility management function (AMF), and the session management function network element may be a session management function (SMF). The third network function network element may be but is not limited to a network exposure function network element, for example, may be a network exposure function (NEF). For example, when the first network function network element is a UDM, the second network function network element may be correspondingly an AMF. For another example, when the first network function network element is a PCF, the second network function network element may be correspondingly an SMF. In the examples of the three network function network elements, names of the network elements are merely examples. In future communication, the names of the network elements may change. This is not limited in this application.

(2) In the description of this application, words such as "first" and "second" are merely used for distinction and description, and shall not be understood as an indication or an implication of relative importance or an indication or an implication of an order.

(3) The term "and/or" describes an association relationship for describing associated objects and represents that three relationships may exist. For example, A and/or B may represent the following three cases: Only A exists, both A and B exist, and only B exists. The character "/" generally indicates an "or" relationship between associated objects.

To more clearly describe the technical solutions in the embodiments of this application, with reference to the accompanying drawings, the following describes in detail the service subscription method and apparatus provided in the embodiments of this application.

A possible communications system architecture to which the service subscription method provided in the embodiments of this application is applicable may include a network exposure function network element, a policy control function network element, a data management network element, an application function network element, a core-network access and mobility management function network element, a session management function network element, a terminal device, an access network device, a user plane function network element, and a data network. FIG. 1 shows a possible example of the communications system architecture, which specifically includes: an NEF network element, a PCF network element, a UDM network element, an application function (AF) network element, an AMF network element, an SMF network element, a UE, an access network (AN) device, a user plane function (UPF) network element, and a data network (DN). The AMF network element may be connected to the UE through an N1 interface, the AMF may be connected to the AN device through an N2 interface, the AN device may be connected to the UPF through an N3 interface, the SMF may be connected to the UPF through an N4 interface, and the UPF may be connected to the DN through an N6 interface. An interface name is merely an example for description. This is not specifically limited in this embodiment of this application. It should be understood that this embodiment of this application is not limited to the communications system shown in FIG. 1. Names of the network elements shown in FIG. 1 are merely used as examples for description herein, and are not used as limitations on the network elements included in the communications system architecture to which the method in this application is applicable. The following describes in detail a function of each network element or device in the communications system.

The terminal device may also be referred to as user equipment (UE), a mobile station (MS), a mobile terminal (MT), or the like, and is a device that provides voice and/or data connectivity to a user. For example, the terminal device may include a handheld device that has a wireless connection function, an in-vehicle device, and the like. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. In FIG. 1, the terminal device is shown using UE as an example, and the terminal device is not limited.

A radio access network may be the access network (AN) shown in FIG. 1 and provide a wireless access service to the terminal device. The access network device is a device in the communications system that enables the terminal device to access a wireless network. The access network device is a node in the radio access network, and may also be referred to as a base station, or may also be referred to as a radio access network (RAN) node (or device). Currently, for example, the access network device is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), or a wireless fidelity (Wi-Fi) access point (AP).

The data network, such as the data network (DN) shown in FIG. 1, may be the Internet, an Internet Protocol (IP) multimedia service (IMS) network, a regional network (namely, a local network, such as a mobile edge computing (MEC) network), or the like. The data network includes an application server, and the application server provides a service to the terminal device by transmitting data with the terminal device.

A core network is configured to enable the terminal device to access a DN that can implement a service of the terminal device. The following describes functions of network elements in the core network.

The core-network access and mobility management function network element may be configured to manage access control and mobility of the terminal device. In actual application, the core-network access and mobility management function network element includes a mobility management function in a mobility management entity (MME) in a network framework of long term evolution (LTE), and includes an access management function. The core-network access and mobility management function network element may be responsible for registration of the terminal device, mobility management, a tracking area update procedure, reachability detection, selection of a session management function network element, mobility status transition management, and the like. For example, in 5G, the core-network access and mobility management function network element may be an access and mobility management function (AMF) network element, for example, as shown in FIG. 1. In future communication, for example, in 6th Generation (6G), the core-network access and mobility management function network element may still be an AMF network element or have another name. This is not limited in this application. When the core-network access and mobility management function network element is an AMF network element, the AMF may provide an Namf service.

The session management function network element may be configured to be responsible for session management (including session establishment, modification, and release) of the terminal device, selection and reselection of a user plane function network element, IP address assignment of the terminal device, quality of service (QoS) control, and the like. For example, in 5G, the session management function network element may be a session management function (SMF) network element, for example, as shown in FIG. 1. In future communication, for example, in 6G, the session management function network element may still be an SMF network element or have another name. This is not limited in this application. When the session management function network element is an SMF network element, the SMF may provide an Nsmf service.

The policy control function network element may be configured to be responsible for policy control decision making, and providing functions such as service-based data flow detection and application detection, gating, QoS, and flow-based charging control. For example, in 5G, the policy control function network element may be a policy control function (PCF) network element, for example, as shown in FIG. 1. In future communication, for example, in 6G, the policy control function network element may still be a PCF network element or have another name. This is not limited in this application. When the policy control function network element is a PCF network element, the PCF network element may provide an Npcf service.

A main function of the application function network element is to interact with a 3rd generation partnership project (3GPP) core network to provide a service, in order to affect service flow routing, access network capability exposure, policy control, and the like. For example, in 5G, the application function network element may be an application function (AF) network element, for example, as shown in FIG. 1. In future communication, for example, in 6G, the application function network element may still be an AF network element or have another name. This is not limited in this application. When the application function network element is an AF network element, the AF network element may provide an Naf service.

The data management network element may be configured to manage subscription data of the terminal device, registration information related to the terminal device, and the like. For example, in 5G, the data management network element may be a unified data management (UDM) network element, for example, as shown in FIG. 1. In future communication, for example, in 6G, the data management network element may still be a UDM network element or have another name. This is not limited in this application. When the data management network element is a UDM network element, the UDM network element may provide an Nudm service.

The network exposure function network element may be configured to enable 3GPP to securely provide a network service capability to a third-party AF (for example, a service capability server (SCS) or an application server (AS)). For example, in 5G, the network exposure function network element may be a network exposure function (NEF), for example, as shown in FIG. 1. In future communication, for example, in 6G, the network exposure function network element may still be an NEF network element or have another name. This is not limited in this application. When the network exposure function network element is an NEF, the NEF may provide an Nnef service to another network function network element.

Each of the foregoing network elements in the core network may also be referred to as a function entity, and may be a network element implemented on dedicated hardware, or may be a software instance running on dedicated hardware, or an instance of a virtual function on a proper platform. For example, the virtualization platform may be a cloud platform.

It should be noted that the communications system architecture shown in FIG. 1 is not limited to including only the network elements shown in the figure, and may further include another device not shown in the figure. Details are not described herein in this application one by one.

It should be noted that a distribution form of the network elements in the core network is not limited in this embodiment of this application. The distribution form shown in FIG. 1 is merely an example, and is not a limitation on this application.

For ease of description, subsequently the network element shown in FIG. 1 is used as an example for description in this application, and an XX network element is directly referred to as XX. It should be understood that names of all network elements in this application are merely used as examples, and may also be referred to as other names in future communication, or the network element in this application may be replaced by another entity or device that has a same function in future communication. This is not limited in this application. A unified description is provided herein, and is not repeated in the following content.

It should be noted that the communications system shown in FIG. 1 does not constitute a limitation on a communications system to which the embodiments of this application are applicable. The communications system architecture shown in FIG. 1 is a 5G system architecture. Optionally, the method in the embodiments of this application is further applicable to various future communications systems, such as 6G or another communications network.

Figure 2:
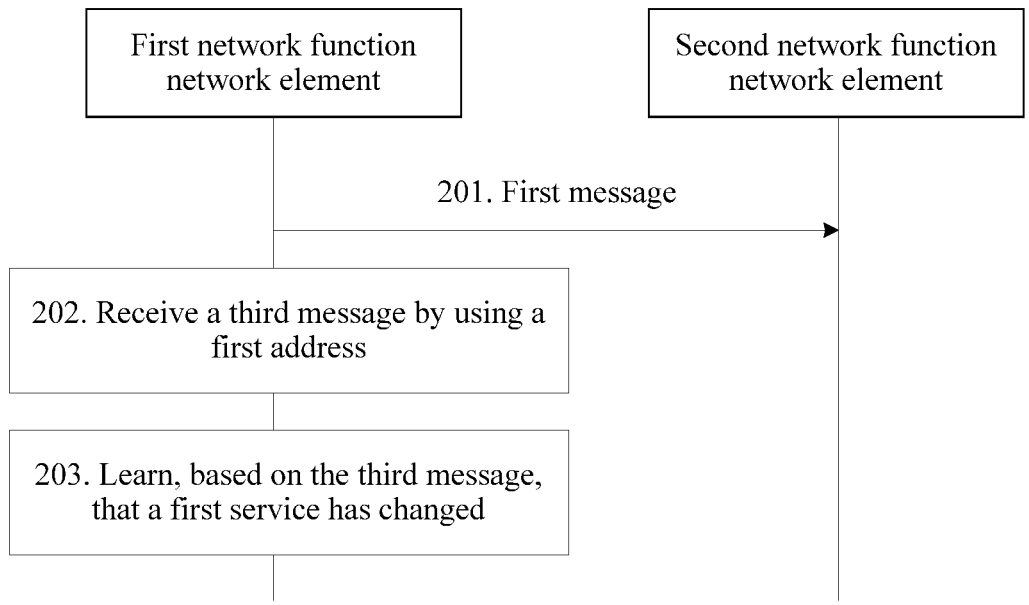
FIG. 2 is a flowchart of a service subscription method according to this application.

An embodiment of this application provides a service subscription method, which is applicable to the communications system shown in FIG. 1. Referring to FIG. 2, a procedure of the method includes the following steps.

Step 201: A first network function network element sends a first message to a second network function network element, in order to subscribe to a first service for a third network function network element from the second network function network element, where the first message includes a first address, and the first address is an address of the first network function network element. The first address (an address may also be referred to as a notification endpoint) may be at least one or a combination of the following: an IP address of the first network function network element, a port number of the first network function network element, a uniform resource locator (URL), and the like.

The first network function network element sends the first message to the second network function network element, in order to subscribe to the first service provided for the third network function network element, from the second network function network element, that is, the first network function network element subscribes to the first service on behalf of the third network function network element.

The first network function network element may be the UDM, the PCF, or the like in the communications system shown in FIG. 1. The second network function network element may be the AMF, the SMF, or the like in the communications system shown in FIG. 1. The third network function network element may be the NEF or the like in the communications system shown in FIG. 1. This is not limited in this application.

In an optional implementation, before the first network function network element sends the first message to the second network function network element, the method further includes the following. The first network function network element allocates a first notification correlation identifier to the first address. That the first network function network element sends the first message to the second network function network element includes the following. The first network function network element sends the first message including the first notification correlation identifier to the second network function network element, such that when a message returned subsequently using another network element carries the first notification correlation identifier, it may be learned that the message is related to a subscription of the first service.

Optionally, the first message further includes instruction information, and the instruction information is used to instruct to receive, using the first address, a message notifying that the first service has changed.

In an optional implementation, the instruction information may be only an instruction information value, or may be an event identifier set (referred to as a third event identifier set in this embodiment of this application). When the instruction information is the third event identifier set, the third event identifier set may include a status change event identifier, a subscription change event identifier (ID), and/or the like. Optionally, the subscription change event identifier may include a subscription correlation identifier change event identifier, an event reporting information change event identifier, or the like.

In an optional implementation, when the first message does not include the foregoing instruction information, after receiving the first message, the second network function network element finds that one more address is carried in the first message compared with that in other approaches, and the address is not associated with any event identifier. That is, when the first address is carried, and the first address is not associated with any event identifier, it may be automatically identified that the first network function network element receives, using the first address, the message notifying that the first service has changed. That is, in this scenario, the first address has the following function: implicitly instructing to receive, using the first address, the message notifying that the first service has changed. Certainly, in this scenario, when the second network function network element finds the first address, the second network function network element may alternatively identify in any other form, for example, using a currently configured mechanism, that the message notifying that the first service has changed may be received using the first address. This is not limited in this application.

In an optional implementation, that the first service has changed means that a status of the first service has changed and/or a subscription of the first service (namely, a subscription of the first service) has changed. The status change of the first service may be a change of a current status of the first service. For example, the current status of the first service may be but is not limited to a paused state, a resumed state, a cancelled state, or a deleted state. The subscription change of the first service may be a change of a subscription attribute. For example, the subscription change may include a subscription correlation identifier change or an event reporting information change. The event reporting information change includes any one or any combination of the following: a change of an event reporting mode, a change of a maximum quantity of event reports, or a change of maximum duration of event reporting.

In an optional implementation, before the first network function network element sends the first message to the second network function network element, the first network function network element further performs the following. The first network function network element receives a second message from the third network function network element, where the second message is used to subscribe to a second service. In this case, the second message sent by the third network function network element to the first network function network element may be considered as a trigger message received by the first network function network element, such that the first network function network element can be triggered to perform step 201.

In an optional implementation, after the first network function network element receives the second message, the method further includes the following. The first network function network element determines, based on the second service, the first service that needs to be subscribed to from the second network function network element. Optionally, the message for subscribing to the first service (namely, the first message) includes a first event identifier set, the second message includes a second event identifier set, the first network function network element determines, in the second event identifier set, a set of event identifiers corresponding to events that need to be provided by the second network function network element, and the determined set of event identifiers is the first event identifier set.

For example, the second message includes a second address, and the second address is an address of the third network function network element. Optionally, the first message further includes the second address, such that the second network function network element provides the first service to the third network function network element using the second address.

In an optional implementation, the second message further includes a second notification correlation identifier, and the second notification correlation identifier is allocated to the second address by the third network function network element.

Optionally, after the first network function network element receives the second message from the third network function network element, the first network function network element allocates a first subscription correlation identifier to a subscription of the second service (namely, a subscription of the second service), and sends the first subscription correlation identifier to the third network function network element. Optionally, when the first network function network element sends the first subscription correlation identifier, the first subscription correlation identifier may be carried in an event exposure subscription response (Nnf_EventExposure_Subscribe Response) sent by the first network function network element to the third network function network element.

In an optional implementation, after the first network function network element sends the first message to the second network function network element, the method further includes the following: The first network function network element receives a second subscription correlation identifier from the second network function network element, where the second subscription correlation identifier is a subscription correlation identifier allocated by the second network function network element to the subscription of the first service (namely, the subscription of the first service) (that is, if a message subsequently received by the first network function network element includes the second subscription correlation identifier, the first network function network element learns that the message is related to the subscription of the first service).

Step 202: The first network function network element receives a third message using the first address.

In an optional implementation, that the first network function network element receives the third message using the first address may specifically include the following two cases.

Case 1: The first network function network element receives the third message from the second network function network element using the first address.

Case 2: The first network function network element receives the third message from a fourth network function network element using the first address, where the second network function network element requests the first service for the third network function network element from the fourth network function network element.

In case 1, after detecting that the first service has changed (for details, refer to the related description of the change of the first service mentioned in step 201), the second network function network element sends the third message to the first network function network element. For example, because a network policy changes, the current status of the first service may be changed from being normally executed to being suspended (Suspend), and from being suspended to being resumed (Resume). For another example, the subscription of the first service is cancelled (Cancel), deleted (Delete), or the like due to a network policy or a user subscription. In case 2, there may be three scenarios. In a first scenario, because a UE moves, a network element serving the UE is handed over from the second network function network element to the fourth network function network element. In this case, the fourth network function network element has a same function as the second network function network element. In this scenario, the second network function network element generates context information based on subscription information of the first service, sends the context information to the fourth network function network element to request the first service from the fourth network function network element, and sends the first address (which may be included in the context information) to the fourth network function network element. Subsequently, after detecting that the first service has changed (for example, the fourth network function network element allocates a new subscription correlation identifier to the subscription of the first service), the fourth network function network element sends the third message to the first network function network element. In a second scenario, because a UE moves, a network element serving the UE is handed over from the second network function network element to the fourth network function network element. In this case, a function of the fourth network function network element is different from that of the second network function network element. In this scenario, the second network function network element generates context information based on subscription information of the first service, sends the context information to the fourth network function network element to request the first service from the fourth network function network element, and sends the first address to the fourth network function network element. After detecting, using the function of the fourth network function network element, that the first service has changed, the fourth network function network element sends the third message to the first network function network element. In a third scenario, when the second network function network element cannot provide the first service either, the second network function network element sends a fourth message to another network function network element, namely, the fourth network function network element. The fourth message includes the first address used to subscribe to the first service. In this way, after detecting that the first service has changed, the fourth network function network element sends the third message to the first network function network element.

In an optional implementation, when the first message includes the instruction information, and the instruction information is the third event identifier set, the third message further includes at least one event identifier in the third event identifier set, such that the first network function network element identifies a specific change of the first service.

Step 203: The first network function network element learns, based on the third message, that the first service has changed.

In an optional implementation, after the first network function network element learns, based on the third message, that the first service has changed, the method further includes the following. The first network function network element sends a fifth message to the second address of the third network function network element, where the fifth message is used to notify that the second service has changed.

In an optional implementation, that the first network function network element sends the fifth message to the second address of the third network function network element includes the following. The first network function network element sends the fifth message including the first subscription correlation identifier mentioned in step 201 to the second address of the third network function network element.

In an optional implementation, the third message further includes the second subscription correlation identifier mentioned in step 201. That the first network function network element learns, based on the third message, that the first service has changed includes the following: The first network function network element learns, based on the second subscription correlation identifier in the third message, that the first service has changed.

In an optional implementation, the third message received by the first network function network element using the first address further includes the first notification correlation identifier mentioned in step 201. That the first network function network element learns, based on the third message, that the first service has changed includes the following. The first network function network element learns, based on the first notification correlation identifier in the third message, that the first service has changed (that is, if a message subsequently received by the first network function network element includes the first notification correlation identifier, the first network function network element learns that the message is related to the subscription of the first service).

In an optional implementation, that the first network function network element sends the fifth message to the second address of the third network function network element includes the following. The first network function network element sends the fifth message including the second notification correlation identifier mentioned in step 201 to the second address of the third network function network element.

Optionally, during implementation, when the change of the first service is the status change mentioned in step 201, the third message further includes first status information. The fifth message further includes second status information. The first status information or the second status information may be a paused state, a resumed state, a cancelled state, a deleted state, or the like. Optionally, the third message further includes an event identifier and/or a user identity corresponding to the first status information.

Optionally, when the change of the first service is the subscription change mentioned in step 201, the third message further includes a subscription attribute of a changed subscription of the first service. The fifth message further includes a subscription attribute of a changed subscription of the second service. For example, when the subscription change is a subscription correlation identifier change, the subscription attribute of the changed subscription of the first service or the subscription attribute of the changed subscription of the second service is an updated subscription correlation identifier. When the subscription change is an event reporting information change, the subscription attribute of the changed subscription of the first service or the subscription attribute of the changed subscription of the second service may include any one or any combination of the following: an updated event reporting mode, an updated maximum quantity of event reports, or updated maximum duration of event reporting.

According to the service subscription method provided in this embodiment of this application, the first network function network element sends the first message to the second network function network element, in order to subscribe to the first service for the third network function network element from the second network function network element, where the first message includes the first address, and the first address is the address of the first network function network element; and the first network function network element receives the third message using the first address, and learns, based on the third message, that the first service has changed. In this method, the first network function network element sends the address of the first network function network element to the second network function network element. Therefore, when the first service changes, the first network function network element may receive a notification that the service has changed. In this way, a mechanism for reporting a service change is improved, such that a service subscription procedure can be relatively perfect, and no interruption is caused.

The service subscription method provided in the embodiments of this application is described below in detail in embodiments of FIG. 3, FIG. 4A and FIG. 4B, and FIG. 5 based on the embodiment of FIG. 2 using examples.

Figure 3:
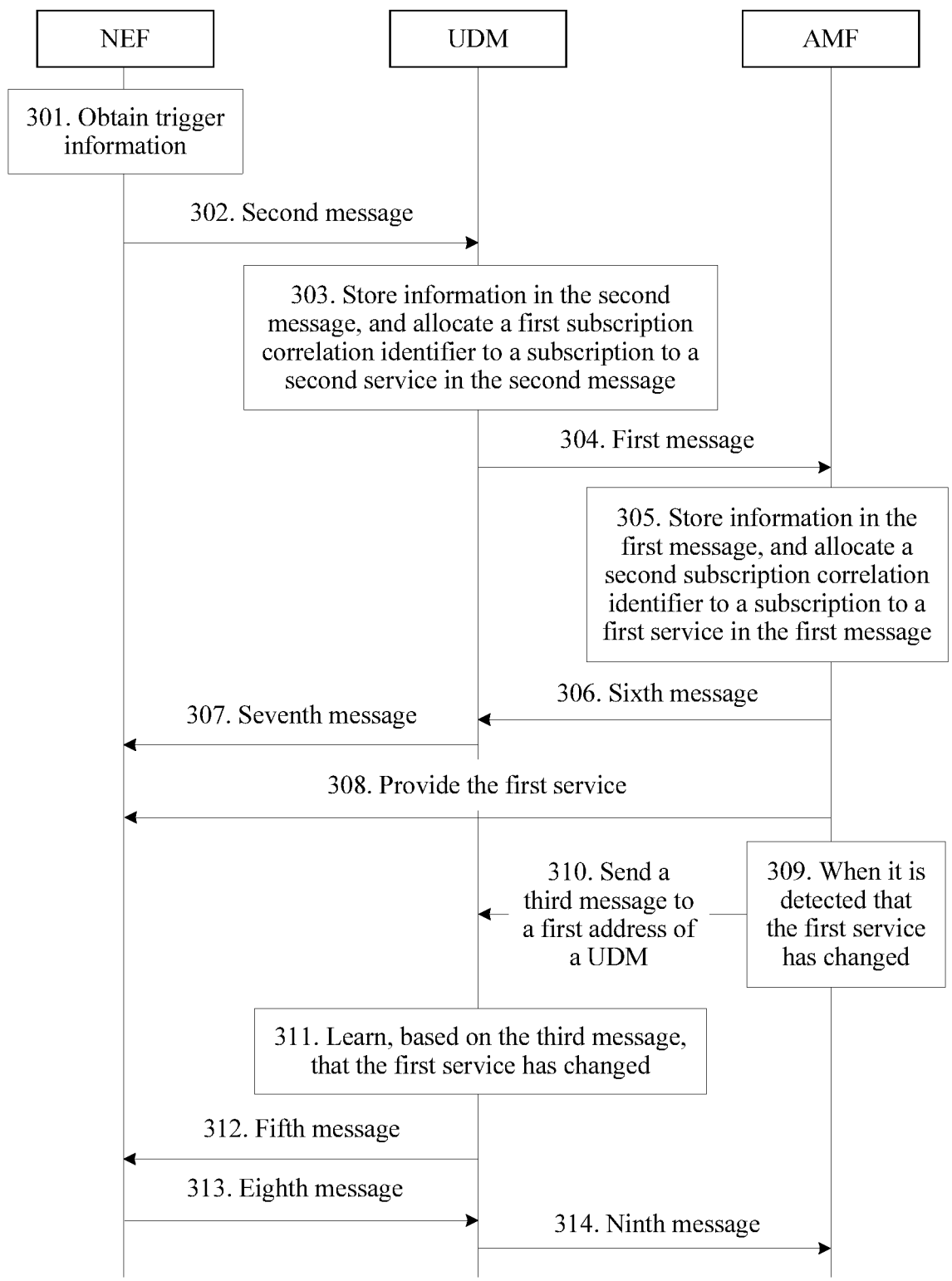
FIG. 3 is an example flowchart of a service subscription method according to this application.

As shown in FIG. 3, an embodiment of this application further provides an example of a service subscription method. In this example, the first network function network element is a UDM, the second network function network element is an AMF, and the third network function network element is an NEF. The NEF subscribes to a service (also referred to as a subscription event notification service) from the UDM, and the UDM further subscribes to the service for the NEF from the AMF. A procedure of the example may include the following steps.

Step 301: The NEF obtains trigger information. For example, after the NEF obtains the trigger information, the NEF is triggered to perform service subscription from the UDM.

Optionally, the trigger information may come from another network function network element, such as an AF. The trigger information may be alternatively obtained through triggering by an internal trigger mechanism of the NEF.

Step 302: The NEF sends a second message to the UDM, and the NEF subscribes to a second service from the UDM using the second message.

The second message includes an address of the NEF, namely, a second address. In this way, the NEF receives a required event using the second address. In an optional implementation, the second message further includes the second event identifier set (such as an Event Id 1) and the second notification correlation identifier (such as a Notification Correlation ID) mentioned in the embodiment in FIG. 2. The second event identifier set may include at least one event identifier. The second notification correlation identifier is used by the NEF to correlate a subsequently received event notification (namely, information in a subsequently received fifth message) with a previously delivered event subscription (namely, subscription information of the second service in the second message).

In an optional implementation, the second message further includes an external identifier of UE (for example, for one UE), a group identifier of a group of UEs (for example, for a group of UEs), or an indication of any UE (for example, any UE parameter, valid for all UEs in a live network), such that it can be determined for whom the second service is finally provided.

In an optional implementation, the second message further includes event reporting information, and the event reporting information includes any one or any combination of the following: an event reporting mode, a maximum quantity of event reports, or maximum duration of event reporting. The event reporting mode may be one-time reporting, continuous reporting, periodic reporting, or the like.

In an optional implementation, the second message may be an event exposure subscription request (Nudm_Event Exposure_Subscribe Request) sent by the NEF to the UDM. During implementation, the NEF sends a hypertext transfer protocol (HTTP) request (POST) to the UDM. A destination address of the request may be a uniform resource locator 1 (URL 1), and a message body of the HTTP POST carries the foregoing information that may be included in the second message. Details are not described herein again.

Step 303: The UDM stores the information in the second message, and allocates a first subscription correlation identifier (Subscription Correlation ID 1) to a subscription of the second service in the second message.

During implementation, the UDM creates a resource for the subscription of the second service based on the information carried in the body, generates a child resource identifier subscription id 1, and constructs a uniform resource identifier 1 (URI 1) for the created resource. The URI 1 is generated using a requested URI as a parent resource and then splicing the child resource identifier. The subscription id 1 herein may be used as the subscription correlation ID 1.

Step 304: The UDM sends a first message to the AMF, and the UDM subscribes to a first service from the AMF using the first message. The first message includes an address of the UDM, namely, a first address.

Optionally, the UDM determines, based on the second service, the first service that needs to subscribe to from the AMF. In some implementations, the first message further includes a first event identifier set, the first event identifier set is generated based on a second event identifier set, the first event identifier set is a set of event identifiers, in the second event identifier set, corresponding to events that need to be provided by the AMF, and the second event identifier set is included in the second message.

For example, after receiving the second message, the UDM first determines one or more event (namely, the second event set corresponding to the second event identifier set in this embodiment of this application) that is in a second event set corresponding to the second event identifier set in the second message and that needs to be provided by the AMF, and then performs step 304. That is, the first event identifier set in the first message is specifically determined based on the second event identifier set in the second message. For example, the first event identifier set is a part or all of the second event identifier set.

In addition to the first address, the first message further includes the second address, which is used by the AMF to provide the first service to the NEF. When the first service changes, the UDM may receive, using the first address, a message notifying that the first service has changed.

In an optional implementation, the first message further includes instruction information, and the instruction information is used to instruct to receive, using the first address, the message notifying that the first service has changed. Specifically, that the first service has changed means that a status of the first service has changed and/or a subscription of the first service has changed. The status change of the first service may be a change of a current status of the first service. For example, the current status of the first service may be but is not limited to a paused state, a resumed state, a cancelled state, or a deleted state. The subscription change may be a change of a subscription attribute. For example, the subscription change includes a subscription correlation identifier change or an event reporting information change. The event reporting information change includes any one or any combination of the following: a change of an event reporting mode, a change of a maximum quantity of event reports, a change of maximum duration of event reporting, and the like. That is, any one of the foregoing cases may indicate that the first service has changed.

In an optional implementation, the instruction information may be only an instruction information value, or may be an event identifier set (namely, a third event identifier set). When the instruction information is the third event identifier set, the third event identifier set may include a status change event identifier, a subscription change event identifier, and/or the like. In this case, the instruction information may be considered as having a function of instructing to provide a special event. For example, the special event may be a status change event or a subscription change event. Optionally, the subscription change event identifier may include a subscription correlation identifier change event identifier or an event reporting information change event identifier.

In an optional implementation, when the first message does not include the foregoing instruction information, after receiving the first message, the AMF finds that the first message carries one more address than that in other approaches. That is, when the first address is carried, the AMF automatically identifies that the UDM receives, using the first address, the message notifying that the first service has changed. That is, in this scenario, the first address has the following function: implicitly instructing to receive, using the first address, the message notifying that the first service has changed. Certainly, in this scenario, when the AMF finds the first address, the AMF may alternatively identify in any other form, for example, using a currently configured mechanism, that the message notifying that the first service has changed may be received using the first address. This is not limited in this application.

In an optional implementation, the first message may be an event exposure subscription request (Namf_Event Exposure_Subscribe Request) sent by the UDM to the AMF.

Step 305: After receiving the first message, the AMF stores information in the first message, and allocates a second subscription correlation identifier (Subscription Correlation ID 2) to a subscription of the first service in the first message.

During implementation, the AMF creates a resource for the subscription of the first service based on information carried in the body, generates a child resource identifier subscription id 1, and constructs a uniform resource identifier (URI 2) for the created resource. The URI 2 is generated using a requested URI as a parent resource and then splicing the child resource identifier. The subscription id 2 herein may be used as the subscription correlation ID 2.

Step 306: The AMF sends a sixth message to the UDM, where the sixth message includes the subscription correlation ID 2.

In an optional implementation, the sixth message may be an event exposure subscription response (Namf_EventExposure_Subscribe Response) sent by the AMF to the UDM. During implementation, the AMF returns an HTTP Response to the UDM, where the HTTP Response carries a "201 Created" status code and a "Location" header. The Location header carries the URI 2.

Step 307: The UDM returns a seventh message to the NEF, where the seventh message includes the subscription correlation ID 1.

In an optional implementation, the seventh message may be an event exposure subscription response (Nudm_EventExposure_Subscribe Response) sent by the UDM to the NEF. During implementation, the UDM returns an HTTP Response to the NEF, where the HTTP Response carries a "201 Created" status code and a "Location" header. The Location header carries the URI 1.

Step 308: When detecting an event that should be provided to the NEF, the AMF provides the first service to the NEF.

Step 309: When detecting that the first service has changed, the AMF performs step 310.

Optionally, when an AMF that serves a UE needs to be reselected because the UE moves, the AMF sends the information received in step 304 to another AMF (namely, a reselected AMF for the UE). In this case, the other AMF detects that the first service has changed, that is, the other AMF may perform the operation of the AMF in step 309, and then the other AMF continues to perform the operation of the AMF in step 310.

In an optional implementation, when the first message includes the instruction information, the AMF (or the other AMF) may perform detection according to the instruction information. Alternatively, the AMF (or the other AMF) may perform detection according to system configuration. The AMF (or the other AMF) detects that the change of the first service may be any change described in step 304, and details are not described herein again.

For example, because a network policy changes or a capability of the AMF (or the other AMF) changes, the current status of the first service may be changed from being normally executed to being suspended (Suspend), and from being suspended to being resumed (Resume). For another example, the subscription of the first service is cancelled (Cancel), deleted (Delete), or the like due to a network policy or a user subscription.

Step 310: The AMF (or the other AMF) sends a third message to the first address of the UDM.

The third message is used to notify that the first service has changed.

During implementation, the third message may be an event exposure subscription change report request (Namf_Event_Exposure_SubscriptionChangeReport Request) or an event exposure notification request (Namf_Event_Exposure_Notify Request) sent by the AMF (or the other AMF) to the UDM.

Step 311: The UDM learns, based on the third message, that the first service has changed.

In an optional implementation, when the change of the first service is the status change described in step 304, the third message further includes first status information. The first status information may be a paused state, a resumed state, a cancelled state, a deleted state, or the like. Optionally, in this case, the third message further includes an event identifier and/or a user identity (such as a UE identity) corresponding to the first status information. The event identifier is used as follows. When a status of one or some events corresponding to the first event identifier set changes, an event identifier that carries a status change may indicate that a status change event occurs. The user identity is used as follows. When an event subscription is for a group of users, a user identity that carries a status change is used to indicate a user corresponding to a status change.

In an optional implementation, when the change of the first service is the subscription change described in step 304, the third message further includes a subscription attribute of a changed subscription of the first service. Optionally, when the subscription change is a subscription correlation identifier change, the changed subscription attribute is an updated subscription correlation identifier. When the subscription change is an event reporting information change, the changed subscription attribute includes any one or any combination of the following: an updated event reporting mode, an updated maximum quantity of event reports, or updated maximum duration of event reporting.

Optionally, the first message further includes a first notification correlation identifier, and the first notification correlation identifier is allocated by the UDM to the first address. The third message sent by the AMF to the first address of the UDM further includes the first notification correlation identifier. That the UDM learns, based on the third message, that the first service has changed includes the following. The UDM learns, based on the first notification correlation identifier in the third message, that the first service has changed.

In an optional implementation, when the first message includes the instruction information, and the instruction information is the third event identifier set, the third message further includes at least one event identifier in the third event identifier set, such that the UDM identifies a specific change of the first service.

Step 312: When the change of the first service notified in the third message affects a subscription of the second service, the UDM sends a fifth message to the NEF, where the fifth message is used to notify that the second service has changed.

During implementation, the fifth message may be an event exposure subscription change report request (Nudm_Event_Exposure_SubscriptionChangeReport Request) or an event exposure notification request (Nudm_Event_Exposure_Notify Request) sent by the UDM to the NEF.

In an optional implementation, when the change of the first service is the status change described in step 304, and the third message further includes the first status information, the fifth message further includes second status information. For a limitation on the second status information, refer to the limitation on the first status information. Details are not described herein again.

In an optional implementation, when the change of the first service is the subscription change described in step 304, and the third message further includes the subscription attribute of the changed subscription of the first service, the fifth message further includes the subscription attribute of the changed subscription of the second service. For a limitation on a subscription attribute of a changed subscription of the second service, refer to the limitation on the changed subscription attribute in the foregoing step. Details are not described herein again.

During implementation, the second message further includes a second notification correlation identifier, and the second notification correlation identifier is allocated by the NEF to the second address. The fifth message sent by the UDM to the NEF further includes the second notification correlation identifier.

Step 313: The NEF sends an eighth message to the UDM.

For example, the eighth message may be an event exposure subscription change report response (Nudm_Event_Exposure_SubscriptionChangeReport Response) or an event exposure notification response (Nudm_Event_Exposure_Notify Response) sent by the NEF to the UDM.

Step 314: The UDM sends a ninth message to the AMF.

For example, the ninth message may be an event exposure subscription change report response (Namf_Event_Exposure_SubscriptionChangeReport Response) or an event exposure notification response (Namf_Event_Exposure_Notify Response) sent by the UDM to the AMF.

In the foregoing example, because the UDM sends the address of the UDM to the AMF, when the first service changes, the UDM may receive a notification, such that a service subscription procedure can be relatively perfect, and no interruption is caused.

Figure 4A:
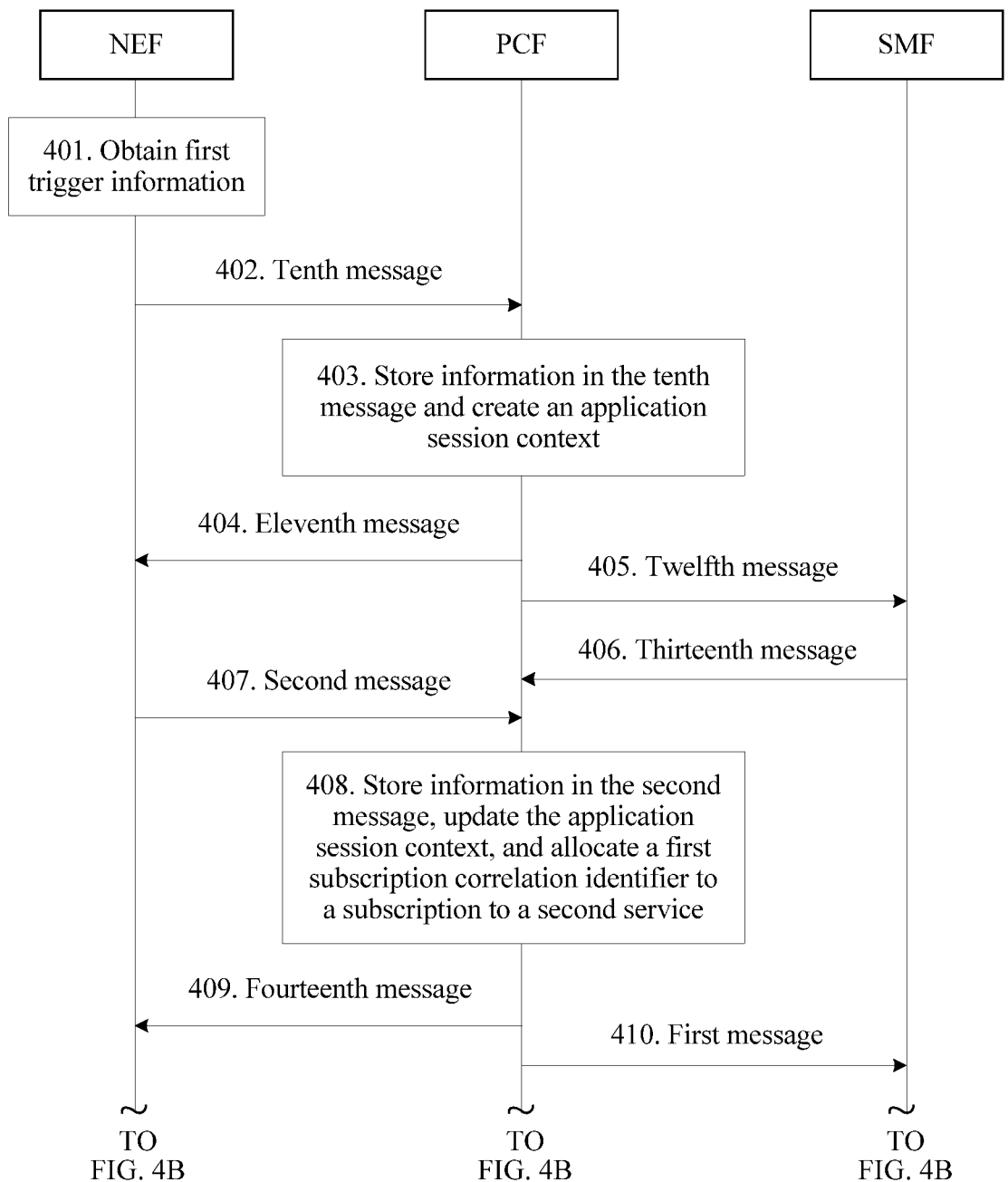
FIG. 4A and FIG. 4B are example flowcharts of another service subscription method according to this application.
Figure 4B:
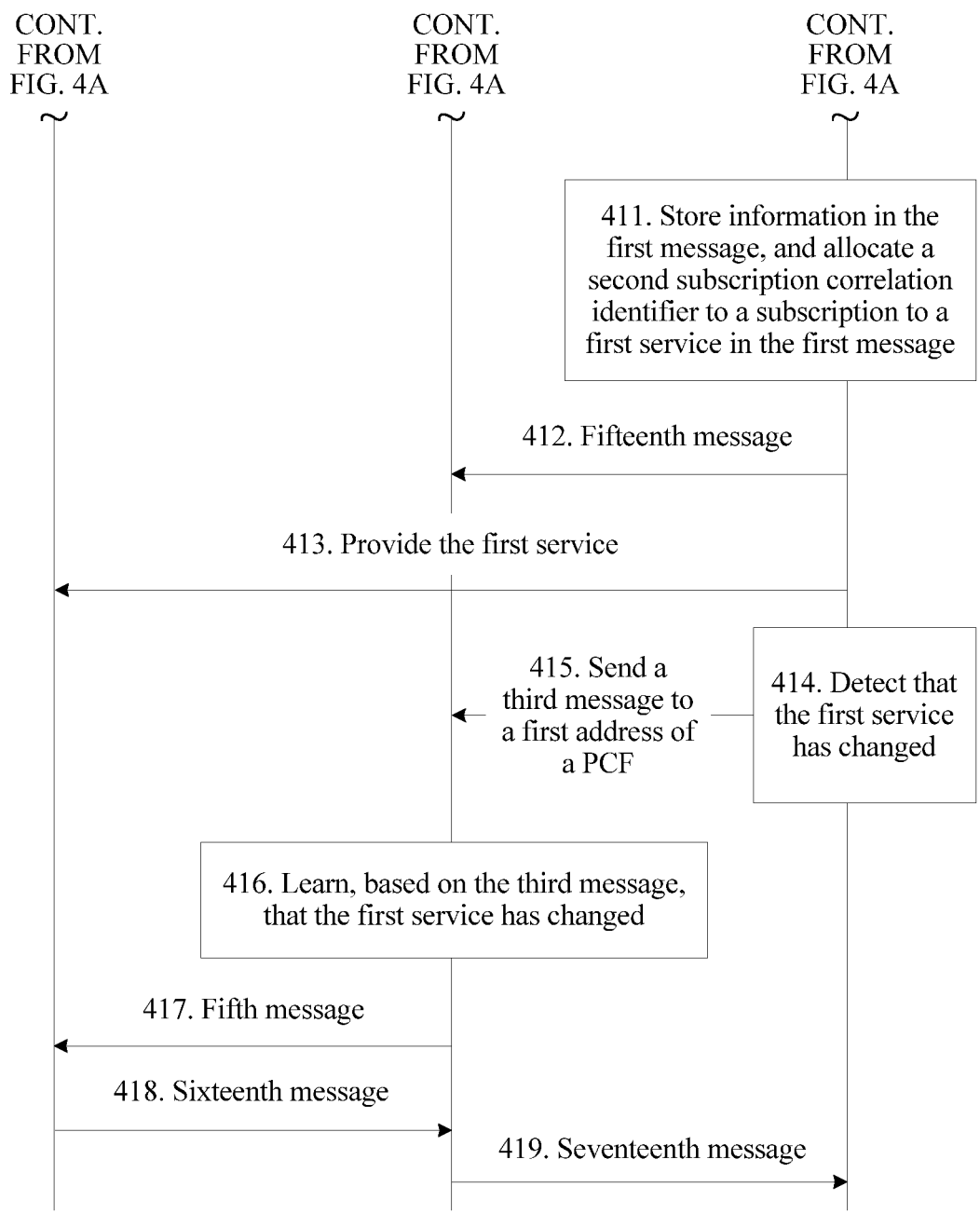

As shown in FIG. 4A and FIG. 4B, an embodiment of this application further provides an example of a service subscription method. In this example, the first network function network element is a PCF, the second network function network element is an SMF, and the third network function network element is an NEF. The NEF subscribes to a service from the PCF, and the PCF further subscribes to the service for the NEF from the SMF. A procedure of the example may include the following steps.

Step 401: The NEF obtains first trigger information. For example, after the NEF obtains the first trigger information, the NEF is triggered to request policy authorization from the PCF.

Optionally, the first trigger information may come from another network function network element, for example, an AF. In this case, the first trigger information of the AF may be that the AF requests policy authorization from the PCF. The first trigger information may be alternatively obtained through triggering by an internal trigger mechanism of the NEF.

Step 402: The NEF sends a tenth message to the PCF, where the tenth message includes application layer information and is used to request policy authorization.

For example, the tenth message may be a policy authorization request (Npcf_PolicyAuthorization_Create Request) sent by the NEF to the PCF. During implementation, the NEF sends an HTTP POST to the PCF, and a message body of the HTTP POST carries the application layer information.

Step 403: The PCF stores the information in the tenth message, and creates an application session context.

During implementation, the PCF creates a resource for an application session based on the application layer information carried in the body of the HTTP POST in step 402, generates a child resource identifier appsession id, and constructs a URI 1 for the created resource. The URI 1 is generated using a requested URI as a parent resource and then splicing the child resource identifier.

Optionally, the tenth message may include a network policy, a user subscription, and the like.

Step 404: The PCF sends an eleventh message to the NEF. For example, the eleventh message may be a policy authorization response (Npcf_PolicyAuthorization_Create Response) sent by the PCF to the NEF.

During implementation, the PCF may return an HTTP Response to the NEF, where the HTTP Response carries a "201 Created" status code and a "Location" header. The Location header carries the URI 1 constructed in step 403.

Step 405: After performing policy decision making based on the application layer information in the tenth message, the PCF sends a twelfth message to the SMF, where the twelfth message includes a formulated policy.

For example, the twelfth message may be a policy update notification request (Npcf_Policy_UpdateNotify Request) sent by the PCF to the SMF. During implementation, the PCF sends an HTTP POST to the SMF, where a message body carries the formulated policy.

Step 406: After storing the policy, the SMF returns a thirteenth message to the PCF.

For example, the thirteenth message may be a policy update notification response (Npcf_Policy_UpdateNotify Response) sent by the SMF to the PCF. During implementation, the SMF sends an HTTP Response to the PCF, where the HTTP Response carries a status code "200 OK".

Step 407: After the NEF obtains second trigger information, and needs to subscribe to a service for the application session, the NEF sends a second message to the PCF, where the second message is used to subscribe to a second service from the PCF.

The second message includes an address of the NEF, namely, a second address. In this way, the NEF receives a required event using the second address. In an optional implementation, the second message further includes the second event identifier set (Event Id 1) and the second notification correlation identifier (Notification Correlation ID) mentioned in the embodiment in FIG. 2. The second event identifier set may include at least one event identifier.

In an optional implementation, the second message further includes an external identifier of UE (for example, for one UE), a group identifier of a group of UEs (for example, for a group of UEs), or an indication of any UE (for example, any UE parameter, valid for all UEs in a live network), such that it can be determined for whom the second service is finally provided.

In an optional implementation, the second message further includes event reporting information, and the event reporting information includes any one or any combination of the following: an event reporting mode, a maximum quantity of event reports, or maximum duration of event reporting. The event reporting mode may be one-time reporting, continuous reporting, periodic reporting, or the like.

In an optional implementation, the second message may be a policy authorization subscription request (Npcf_PolicyAuthorization_Subscribe Request) sent by the NEF to the PCF. During implementation, the NEF sends an HTTP PATCH to the PCF, and a message body of the HTTP PATCH carries the foregoing information that may be included in the second message. Details are not described herein again.

Step 408: The PCF stores the information in the second message, updates the application session context, and allocates a first subscription correlation identifier (Subscription Correlation ID 1) to a subscription of the second service.

During implementation, the subscribed service is added to the resource created in step 403.

Step 409: The PCF sends a fourteenth message to the NEF, where the fourteenth message includes the subscription correlation ID 1.

For example, the fourteenth message may be a policy authorization subscription response (Npcf_PolicyAuthorization_Subscribe Response) sent by the PCF to the NEF.

During implementation, the PCF sends an HTTP Response to the NEF, where the HTTP Response carries a status code "200 OK" and the Subscription Correlation ID 1.

Step 410: The PCF sends a first message to the SMF, and the PCF subscribes to a first service from the SMF using the first message. The first message includes an address of the PCF, namely, a first address.

Optionally, the PCF determines, based on the second service, the first service that needs to subscribe to from the SMF. The first message further includes a first event identifier set, the first event identifier set is generated based on the second event identifier set, the first event identifier set is a set of event identifiers, in the second event identifier set, corresponding to events that need to be provided by the SMF, and the second event identifier set is included in the second message.

For example, after receiving the second message, the PCF first determines an event (namely, the second event set corresponding to the second event identifier set in this embodiment of this application) that is in a second event set corresponding to the second event identifier set in the second message and that needs to be provided by the SMF, and then performs step 410. That is, the first event identifier set in the first message is specifically determined based on the second event identifier set in the second message. For example, the first event identifier set is a part or all of the second event identifier set.

For example, in addition to the first address, the first message further includes the second address, which is used by the SMF to provide the first service to the NEF. When the first service changes, the PCF may receive, using the first address, a message notifying that the first service has changed.

In an optional implementation, the first message further includes instruction information, and the instruction information is used to instruct to receive, using the first address, the message notifying that the first service has changed. For example, that the first service has changed means that a status of the first service has changed and/or a subscription of the first service has changed. The status change of the first service may be a change of a current status of the first service. For example, a current status of the first service may be but is not limited to a paused state, a resumed state, a cancelled state, or a deleted state. The subscription change may be a change of a subscription attribute. For example, the subscription change includes a subscription correlation identifier change or an event reporting information change. The event reporting information change includes any one or any combination of the following: a change of an event reporting mode, a change of a maximum quantity of event reports, a change of maximum duration of event reporting, and the like. That is, any one of the foregoing cases may indicate that the first service has changed.

In an optional implementation, the instruction information may be only an instruction information value, or may be an event identifier set (namely, a third event identifier set). When the instruction information is the third event identifier set, the third event identifier set may include a status change event identifier, a subscription change event identifier, and/or the like. In this case, the instruction information may be considered as having a function of instructing to provide a special event. For example, the special event may be a status change event or a subscription change event. Optionally, the subscription change event identifier may include a subscription correlation identifier change event identifier or an event reporting information change event identifier.

In an optional implementation, when the first message does not include the foregoing instruction information, after receiving the first message, the SMF finds that the first message carries one more address than that in other approaches. That is, when the first address is carried, it may be automatically identified that the PCF receives, using the first address, the message notifying that the first service has changed. That is, in this scenario, the first address has the following function: implicitly instructing to receive, using the first address, the message notifying that the first service has changed. Certainly, in this scenario, when the AMF finds the first address, the AMF may alternatively identify in any other form, for example, using a currently configured mechanism, that the message notifying that the first service has changed may be received using the first address. This is not limited in this application.

Step 411: The SMF stores the information in the first message, and allocates a second subscription correlation identifier (Subscription Correlation ID 2) to a subscription of the first service in the first message.

During implementation, the SMF creates a resource for the subscription of the first service based on the information carried in the first message, generates a child resource identifier subscription id 2, and constructs a URI 2 for the created resource. The URI 2 is generated using a requested URI as a parent resource and then splicing the child resource identifier. The subscription id 2 herein may be used as the subscription correlation ID 2.

Step 412: The SMF sends a fifteenth message to the PCF, where the fifteenth message includes the subscription correlation ID 2.

In an optional implementation, the fifteenth message may be an event exposure subscription response (Nsmf_Event-Exposure_Subscribe Response) sent by the SMF to the PCF. During implementation, the SMF returns an HTTP Response to the PCF, where the HTTP Response carries a "201 Created" status code and a "Location" header. The Location header carries the URI 2 constructed in step 411.

Step 413: When detecting an event that can be provided to the NEF, the SMF provides the first service to the NEF.

Step 414: When detecting that the first service has changed, the SMF performs step 415.

Optionally, when an SMF serving the UE needs to be reselected because the UE moves, the SMF sends the information received in step 410 to another SMF (that is, a reselected SMF for the UE). In this case, the other SMF detects that the first service has changed (for example, the other SMF allocates a new subscription correlation identifier to the subscription of the first service). That is, the other SMF may perform the operation of the SMF in step 414, and then the other SMF continues to perform the operation of the SMF in step 415.

For an implementation, refer to the description in step 309 in the embodiment shown in FIG. 3. Principles are the same, and details are not described herein again.

Step 415: The SMF (or the other SMF) sends a third message to the first address of the PCF, where the third message is used to notify that the first service has changed.

During implementation, the third message may be an event exposure subscription change report request (Nsmf_Event_Exposure_SubscriptionChangeReport Request) or an event exposure notification request (Nsmf_Event_Exposure_Notify Request) sent by the SMF to the PCF.

Step 416: The PCF learns, based on the third message, that the first service has changed.

In an optional implementation, when the change of the first service is the status change described in step 410, the third message further includes first status information. The first status information may be a paused state, a resumed state, a cancelled state, a deleted state, or the like. Optionally, in this case, the third message further includes an event identifier and/or a user identity (such as a UE identity) corresponding to the first status information. The event identifier is used as follows. When a status of one or some events corresponding to the first event identifier set changes, an event identifier that carries a status change may indicate that a status change event occurs. The user identity is used as follows. When an event subscription is for a group of users, a user identity that carries a status change is used to indicate a user corresponding to a status change.

In an optional implementation, when the change of the first service is the subscription change described in step 410, the third message further includes a subscription attribute of a changed subscription of the first service. Optionally, when the subscription change is a subscription correlation identifier change, the changed subscription attribute is an updated subscription correlation identifier. When the subscription change is an event reporting information change, the changed subscription attribute includes any one or any combination of the following: an updated event reporting mode, an updated maximum quantity of event reports, or updated maximum duration of event reporting.

Optionally, the first message further includes a first notification correlation identifier, and the first notification correlation identifier is allocated by the PCF to the first address. The third message sent by the SMF to the first address of the PCF further includes the first notification correlation identifier. That the PCF learns, based on the third message, that the first service has changed includes the following: The PCF learns, based on the first notification correlation identifier in the third message, that the first service has changed.

In an optional implementation, when the first message includes the instruction information, and the instruction information is the third event identifier set, the third message further includes at least one event identifier in the third event identifier set, such that the PCF identifies a specific change of the first service.

Step 417: When the PCF determines that the change of the first service notified in the third message affects the subscription of the second service, the PCF sends a fifth message to the NEF, where the fifth message is used to notify that the second service has changed.

During implementation, the fifth message may be an event exposure subscription change report request (Npcf_Event_Exposure_SubscriptionChangeReport Request) or an event exposure notification request (Npcf_Event_Exposure_Notify Request) sent by the PCF to the NEF.

In an optional implementation, when the change of the first service is the status change described in step 410, and the third message further includes the first status information, the fifth message further includes second status information. For a limitation on the second status information, refer to the limitation on the first status information. Details are not described herein again.

In an optional implementation, when the change of the first service is the subscription change described in step 410, and the third message further includes the subscription attribute of the changed subscription of the first service, the fifth message further includes the subscription attribute of the changed subscription of the second service. For a limitation on a subscription attribute of a changed subscription of the second service, refer to the limitation on the changed subscription attribute in the foregoing step. Details are not described herein again.

During implementation, the second message further includes a second notification correlation identifier, and the second notification correlation identifier is allocated by the NEF to the second address. The fifth message sent by the PCF to the NEF further includes the second notification correlation identifier.

Step 418: The NEF sends a sixteenth message to the PCF.

For example, the sixteenth message may be an event exposure subscription change report response (Npcf_Event_Exposure_SubscriptionChangeReport Response) or an event exposure notification response (Npcf_Event_Exposure_Notify Response) sent by the NEF to the PCF.

Step 419: The PCF sends a seventeenth message to the SMF.

For example, the seventeenth message may be an event exposure subscription change report response (Nsmf_Event_Exposure_SubscriptionChangeReport Response) or an event exposure notification response (Nsmf_Event_Exposure_Notify Response) sent by the PCF to the SMF.

In the foregoing example, because the PCF sends the address of the PCF to the SMF, when the first service changes, the PCF may receive a notification, such that a service subscription procedure can be relatively perfect, and no interruption is caused.

Figure 5:
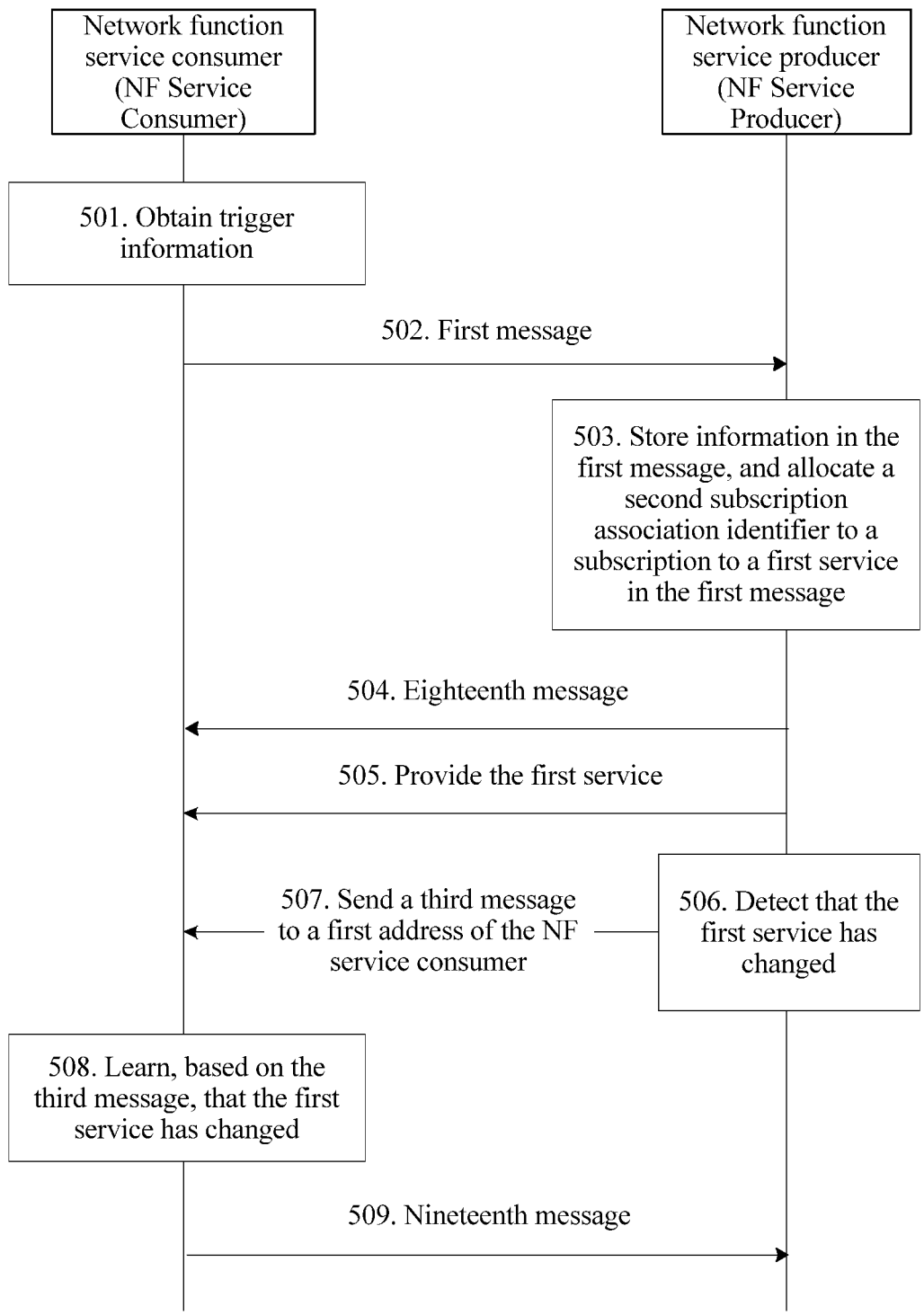
FIG. 5 is a flowchart of another service subscription method according to this application.

Based on the foregoing embodiments, an embodiment of this application further provides a service subscription method. In this embodiment, network elements that perform service subscription may be collectively referred to as a network function (NF) service consumer, and network elements that provide services may be collectively referred to as a network function (NF) service producer. Both the network function service consumer and the network function service producer are the network function network elements in the communications system shown in FIG. 1. Referring to FIG. 5, a procedure of the method includes the following steps.

Step 501: The NF service consumer obtains trigger information, and needs to subscribe to a service for another function network element A from the NF service producer. For example, after the NF service consumer obtains the trigger information, the NF service consumer is triggered to perform service subscription from the NF service producer.

Optionally, the trigger information may come from another network function network element (namely, another NF). For example, the trigger information may be obtained through triggering by the NEF in the foregoing embodiment, that is, triggering by the second message. The trigger information may be alternatively obtained through triggering by an internal trigger mechanism of the NF service consumer.

Step 502: The NF service consumer sends a first message to the NF service producer, and the NF service consumer subscribes to a first service from the NF service producer using the first message. The first message includes an address of the NF service consumer, namely, a first address. When the first service changes, the NF service consumer may receive, using the first address, a message notifying that the first service has changed.

For example, in addition to the first address, the first message further includes a notification target address. A device corresponding to the notification target address may receive a required event using the notification target address, that is, the NF service producer provides the first service to the device corresponding to the notification target address using the notification target address. Optionally, the notification target address may be but is not limited to the second address in the foregoing embodiment.

In an optional implementation, the first message further includes a first notification correlation identifier, and the first notification correlation identifier is used by the NF service consumer to correlate an event notification with a corresponding event subscription. The first message further includes an external identifier of UE (for example, for one UE), a group identifier of a group of UEs (for example, for a group of UEs), or an indication of any UE (for example, any UE parameter, valid for all UEs in a live network).

In an optional implementation, the first message further includes event reporting information, and the event reporting information includes any one or any combination of the following: an event reporting mode, a maximum quantity of event reports, or maximum duration of event reporting. The event reporting mode may be one-time reporting, continuous reporting, periodic reporting, or the like.

In an optional implementation, the first message further includes instruction information, and the instruction information is used to instruct to receive, using the first address, the message notifying that the first service has changed. For example, that the first service has changed means that a status of the first service has changed and/or a subscription of the first service has changed. The status change of the first service may be a change of a current status of the first service. For example, the current status of the first service may be but is not limited to a paused state, a resumed state, a cancelled state, or a deleted state. The subscription change may be a change of a subscription attribute. For example, the subscription change includes a subscription correlation identifier change or an event reporting information change. The event reporting information change includes any one or any combination of the following: a change of an event reporting mode, a change of a maximum quantity of event reports, a change of maximum duration of event reporting, and the like. That is, any one of the foregoing cases may indicate that the first service has changed.

In an optional implementation, the instruction information may be only an instruction information value, or may be an event identifier set (namely, a third event identifier set). When the instruction information is the third event identifier set, the third event identifier set may include a status change event identifier, a subscription change event identifier, and/or the like. In this case, the instruction information may be considered as having a function of instructing to provide a special event. For example, the special event may be a status change event or a subscription change event. Optionally, the subscription change event identifier may include a subscription correlation identifier change event identifier or an event reporting information change event identifier.

In an optional implementation, when the first message does not include the foregoing instruction information, after receiving the first message, the NF service producer finds that the first message carries one more address than that in other approaches. That is, when the first address is carried, the NF service producer automatically identifies that the NF service consumer receives, using the first address, the message notifying that the first service has changed. That is, in this scenario, the first address has the following function: implicitly instructing to receive, using the first address, the message notifying that the first service has changed. Certainly, in this scenario, when the NF service producer finds the first address, the NF service producer may alternatively identify in any other form, for example, using a currently configured mechanism, that the message notifying that the first service has changed may be received using the first address. This is not limited in this application.

In an optional implementation, the first message may be an event exposure subscription request (Nnf_Event_Exposure_Subscribe Request) sent by the NF service consumer to the NF service producer.

Step 503: After receiving the first message, the NF service producer stores the information in the first message, and allocates a second subscription correlation identifier (Subscription Correlation ID 2) to a subscription of the first service in the first message.

During implementation, the NF service producer creates a resource for the subscription of the first service based on information carried in a body, generates a child resource identifier subscription id 1, and constructs a uniform resource identifier (URI 2) for the created resource. The URI 2 is generated using a requested URI as a parent resource and then splicing the child resource identifier. The subscription id 2 herein may be used as the subscription correlation ID 2.

Step 504: The NF service producer sends an eighteenth message to the NF service consumer, where the eighteenth message includes the subscription correlation ID 2.

In an optional implementation, the eighteenth message may be an event exposure subscription response (Nnf_EventExposure_Subscribe Response) sent by the NF service producer to the NF service consumer. During implementation, the NF service producer returns an HTTP Response to the NF service consumer, where the HTTP Response carries a "201 Created" status code and a "Location" header. The Location header carries the URI 2.

Step 505: When detecting an event that can be provided to the other function network element A, the NF service producer provides the first service to the other function network element A.

Step 506: When detecting that the first service has changed, the NF service producer performs step 507.

Optionally, when an NF service producer serving the UE needs to be reselected because the UE moves, the NF service producer sends the information received in step 502 to another NF network element B (namely, a reselected NF network element for the UE). In this case, the other NF network element B detects that the first service has changed, that is, the other NF network element B may perform the operation of the NF service producer in step 505, and then the other NF network element B continues to perform the operation of the NF service producer in step 507. A function of the other NF network element B is the same as that of the NF service producer.

In an optional implementation, when the first message includes the instruction information, the NF service producer (or the other NF network element B) may perform detection according to the instruction information. Alternatively, the NF service producer (or the other NF network element B) may perform detection according to system configuration. The NF service producer (or the other NF network element B) detects that a change of the first service may be any change described in step 502, and details are not described herein again.

For example, because a network policy changes or a capability of the NF service producer (or the other NF network element B) changes, a current status of the first service may be changed from being normally executed to being suspended (Suspend), and from being suspended to being resumed (Resume). For another example, the subscription of the first service is cancelled (Cancel), deleted (Delete), or the like due to a network policy or a user subscription.

Step 507: The NF service producer (or the other NF network element B) sends a third message to the first address of the NF service consumer, where the third message is used to notify that the first service has changed.

During implementation, the third message may be an event exposure subscription change report request (Nnf_Event_Exposure_SubscriptionChangeReport Request) or an event exposure notification request (Nnf_Event_Exposure_Notify Request) sent by the NF service producer (or the other NF network element B) to the NF service consumer.

Step 508: The NF service consumer learns, based on the third message, that the first service has changed.

In an optional implementation, when the change of the first service is the status change described in step 502, the third message further includes first status information. The first status information may be a paused state, a resumed state, a cancelled state, a deleted state, or the like. Optionally, in this case, the third message further includes an event identifier and/or a user identity (such as a UE identity) corresponding to the first status information. The event identifier is used as follows. When a status of one or some events corresponding to the first event identifier set changes, an event identifier that carries a status change may indicate that a status change event occurs. The user identity is used as follows. When an event subscription is for a group of users, a user identity that carries a status change is used to indicate a user corresponding to a status change.

In an optional implementation, when the change of the first service is the subscription change described in step 502, the third message further includes a subscription attribute of a changed subscription of the first service. Optionally, when the subscription change is a subscription correlation identifier change, the changed subscription attribute is an updated subscription correlation identifier. When the subscription change is an event reporting information change, the changed subscription attribute includes any one or any combination of the following: an updated event reporting mode, an updated maximum quantity of event reports, or updated maximum duration of event reporting.

Optionally, the first message further includes a first notification correlation identifier, and the first notification correlation identifier is allocated by the NF service consumer to the first address. The third message sent by the NF service producer to the first address of the NF service consumer further includes the first notification correlation identifier. That the NF service consumer learns, based on the third message, that the first service has changed includes the following: The NF service consumer learns, based on the first notification correlation identifier in the third message, that the first service has changed.

In an optional implementation, when the first message includes the instruction information, and the instruction information is the third event identifier set, the third message further includes at least one event identifier in the third event identifier set, such that the NF service consumer identifies a specific change of the first service.

Step 509: The NF service consumer sends a nineteenth message to the NF service producer.

For example, the nineteenth message may be an event exposure subscription change report response (Nnf_Event_Exposure_SubscriptionChangeReport Response) or an event exposure notification response (Nnf_Event_Exposure_Notify Response) sent by the NF service consumer to the NF service producer.

In the service subscription method provided in this embodiment of this application, the NF service consumer sends the address of the NF service consumer to the NF service producer. In this way, when the first service changes, the NF service consumer may receive a notification, such that a service subscription procedure can be relatively perfect, and no interruption is caused.

Figure 6:
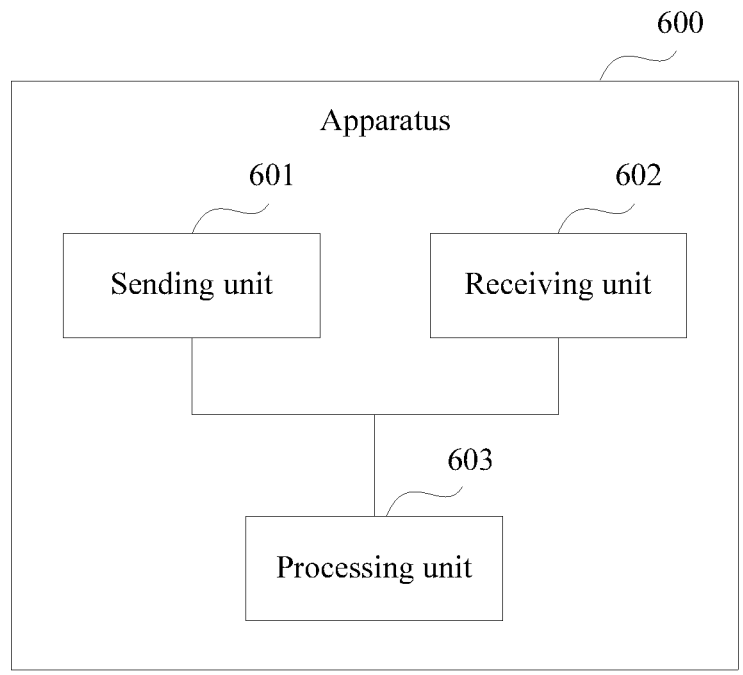
FIG. 6 is a schematic structural diagram of an apparatus according to this application.

Based on a same concept as that in the method embodiment, an embodiment of this application further provides an apparatus, and the apparatus is applied to a first network function network element. The apparatus 600 may be a processor, a chip or a chip system, a function module, or the like in the first network function network element. Referring to FIG. 6, the apparatus 600 may include a sending unit 601, a receiving unit 602, and a processing unit 603. The sending unit 601 is used by the apparatus 600 to send information, the receiving unit 602 is used by the apparatus 600 to receive information, and the processing unit 603 is configured to control and manage an action of the apparatus 600. The processing unit 603 may be further configured to indicate a processing process related to the first network function network element (such as a UDM or a PCF) in any one of the foregoing embodiments and/or another process of the technical solution described in this application. The processing unit 603 may control the sending unit 601 to perform step 201, and control the receiving unit 602 to perform step 202 and step 203. For details, refer to the embodiment shown in FIG. 2. Details are not described herein again.

During hardware implementation, the processing unit 603 may be a processor, a processing circuit, or the like; the sending unit 601 may be a transmitter, a sending circuit, or the like; and the receiving unit 602 may be a receiver, a receiving circuit, or the like. The sending unit 601 and the receiving unit 602 may constitute a transceiver.

Figure 7:
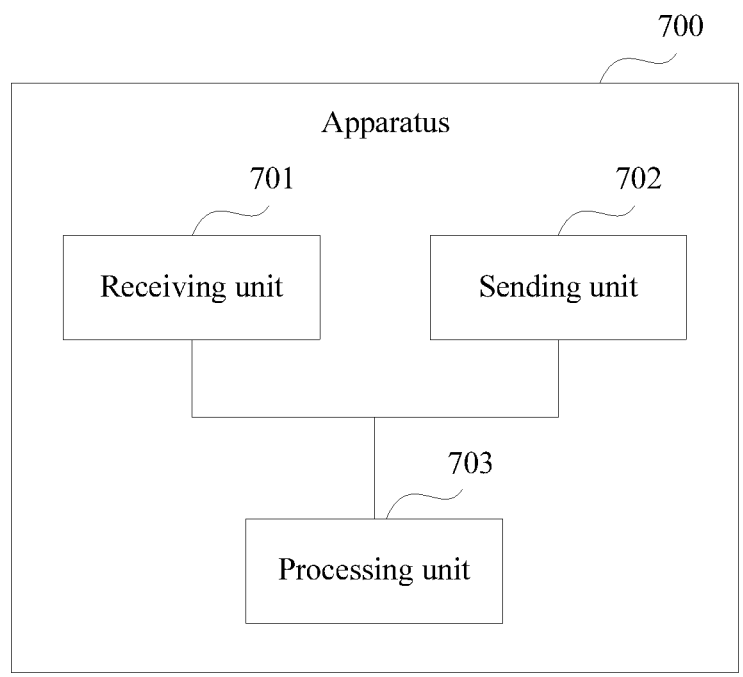
FIG. 7 is a schematic structural diagram of another apparatus according to this application.

Based on a same concept as that in the method embodiment, an embodiment of this application further provides an apparatus, and the apparatus is applied to a second network function network element. The apparatus 700 may be a processor, a chip or a chip system, a function module, or the like in the second network function network element. Referring to FIG. 7, the apparatus 700 may include a receiving unit 701, a sending unit 702, and a processing unit 703. The sending unit 702 is used by the apparatus 700 to send information, the receiving unit 701 is used by the apparatus 700 to receive information, and the processing unit 703 is configured to control and manage an action of the apparatus 700. The processing unit 703 may be further configured to indicate a processing process related to the second network function network element (such as an AMF or an SMF) in any one of the foregoing embodiments and/or another process of the technical solution described in this application. For steps that the processing unit 703 may control the sending unit 702 and the receiving unit 701 to perform, refer to the foregoing embodiments. Repeated content is not described herein again.

During hardware implementation, the processing unit 703 may be a processor, a processing circuit, or the like; the sending unit 702 may be a transmitter, a sending circuit, or the like; and the receiving unit 701 may be a receiver, a receiving circuit, or the like. The sending unit 702 and the receiving unit 701 may constitute a transceiver.

It should be noted that, in the embodiments of this application, unit division is an example, and is merely a logical function division. During actual implementation, another division manner may be used. Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in a form of a software product. The computer software product is stored in a storage medium and includes one or more instructions for instructing a computer device (which may be a personal computer, a server, a network device, or the like) or a processor to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or a compact disc.

Figure 8:
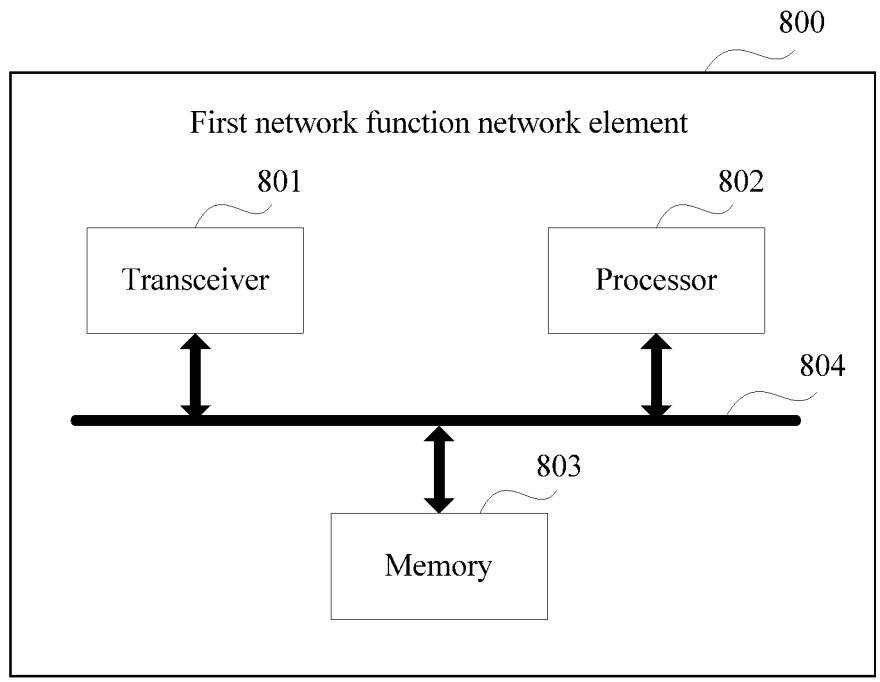
FIG. 8 is a structural diagram of a first network function network element according to this application.

Based on the foregoing embodiments, an embodiment of this application further provides another first network function network element, configured to implement the foregoing service subscription method. Referring to FIG. 8, the first network function network element 800 may include a transceiver 801 and a processor 802. Optionally, the first network function network element 800 may further include a memory 803. The memory 803 may be disposed inside the first network function network element 800, or may be disposed outside the first network function network element 800. The processor 802 controls the transceiver 801 to receive and send data, and is configured to implement the methods performed by the first network function network elements (such as a UDM and a PCF) in FIG. 2 to FIG. 5.

The processor 802 may be a central processing unit (CPU), a network processor (NP), or a combination of a CPU and an NP. The processor 802 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The transceiver 801, the processor 802, and the memory 803 are connected to each other. Optionally, the transceiver 801, the processor 802, and the memory 803 are connected to each other using a bus 804. The bus 804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

In an optional implementation, the memory 803 is configured to store a program and the like. The program may include program code, and the program code includes a computer operation instruction. The memory 803 may include a RAM, and may further include a nonvolatile memory such as at least one magnetic disk memory. The processor 802 executes the application program stored in the memory 803 to implement the foregoing functions, in order to implement the service subscription method provided in the embodiments of this application.

Figure 9:
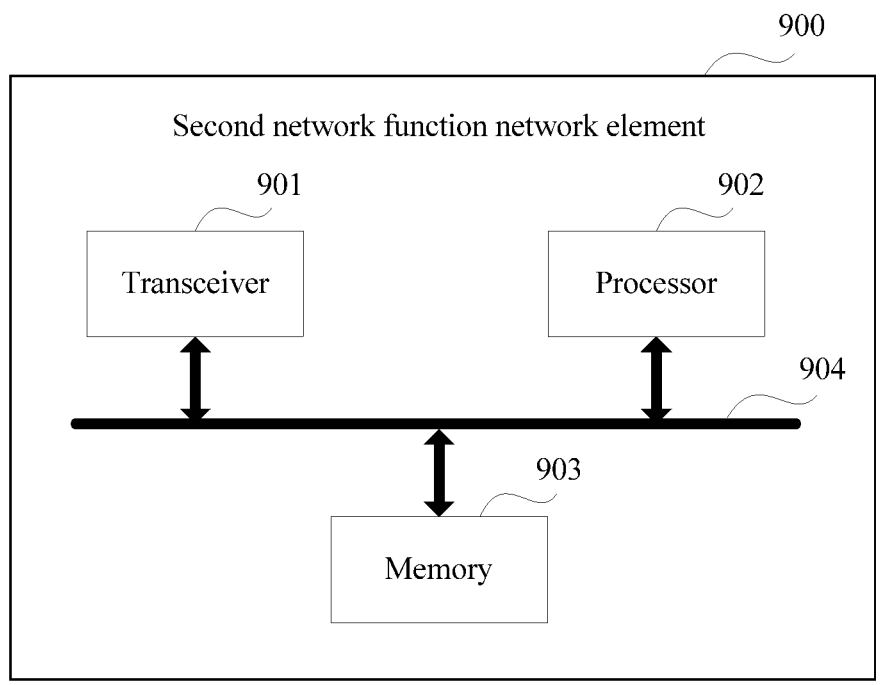
FIG. 9 is a structural diagram of a second network function network element according to this application.

Based on the foregoing embodiments, an embodiment of this application further provides another second network function network element, configured to implement the foregoing service subscription method. Referring to FIG. 9, the second network function network element 900 may include a transceiver 901 and a processor 902. Optionally, the second network function network element 900 may further include a memory 903. The memory 903 may be disposed inside the second network function network element 900, or may be disposed outside the second network function network element 900. The processor 902 controls the transceiver 901 to receive and send data, and is configured to implement the methods performed by the second network function network elements (such as an AMF and an SMF) in FIG. 2 to FIG. 5.

The processor 902 may be a central processing unit (CPU), a network processor (NP), or a combination of a CPU and an NP. The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The transceiver 901, the processor 902, and the memory 903 are connected to each other. Optionally, the transceiver 901, the processor 902, and the memory 903 are connected to each other using a bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

In an optional implementation, the memory 903 is configured to store a program and the like. The program may include program code, and the program code includes a computer operation instruction. The memory 903 may include a RAM, and may further include a nonvolatile memory such as at least one magnetic disk memory. The processor 902 executes the application program stored in the memory 903 to implement the foregoing functions, in order to implement the service subscription method provided in the embodiments of this application.

Based on the foregoing embodiments, an embodiment of this application further provides a computer storage medium. The storage medium stores a software program, and when being read and executed by one or more processors, the software program can implement the method provided in any one or more of the foregoing embodiments. The computer storage medium may include any medium that can store program code, such as a USB flash drive, a removable hard disk, a read-only memory, a random access memory, a magnetic disk, or a compact disc.

Based on the foregoing embodiments, an embodiment of this application further provides a chip, and the chip includes a processor, configured to implement functions in any one or more of the foregoing embodiments, for example, obtain or process information or a message in the foregoing methods. Optionally, the chip further includes a memory, and the memory is configured to store a necessary program instruction and data that are executed by the processor. The chip may include a chip, or include a chip and another discrete device.

In conclusion, according to the service subscription method and the apparatus provided in the embodiments of this application, the first network function network element sends the first message to the second network function network element, in order to subscribe to the first service for the third network function network element from the second network function network element, where the first message includes the first address, and the first address is the address of the first network function network element; and the first network function network element receives the third message using the first address, and learns, based on the third message, that the first service has changed. In this method, the first network function network element sends the address of the first network function network element to the second network function network element. Therefore, when the first service changes, the first network function network element may receive a notification that the service has changed. In this way, a mechanism for reporting a service change is improved, such that a service subscription procedure can be relatively perfect, and no interruption is caused.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, such that the instructions executed by the computer or the processor of any other programmable data processing device generate an apparatus for implementing a specified function in one or more processes in the flowcharts and/or in one or more blocks in the block diagrams.

These computer program instructions may be alternatively stored in a computer readable memory that can instruct a computer or another programmable data processing device to work in a specific manner, such that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

A person skilled in the art can make various modifications and variations to the embodiments of this application without departing from the scope of this application. This application is intended to cover these modifications and variations to the embodiments of this application provided that they fall within the scope of the claims of this application and equivalent technologies thereof.

What is claimed is:

1. A method comprising:
receiving, by a second network function network element from a first network function network element, a first message requesting to subscribe to a service on behalf of a third network function network element, wherein the first message comprises a first address of the first network function network element and a second address of the third network function network element, wherein the first address is usable for sending, to the first network function network element, a second message indicating that a subscription of the service has changed, the second address is usable for sending the service to the third network function network element; and
sending, by the second network function network element, context information to a fourth network function network element when a network element serving a user equipment is handed over from the second network function network element to the fourth network function network element,
wherein the context information comprises the first address and the second address.

2. The method of claim 1, further comprising:
allocating, by the second network function network element, a subscription correlation identifier; and
sending, by the second network function network element, the subscription correlation identifier to the first network function network element.

3. The method of claim 1, further comprising sending, by the fourth network function network element to the first network function network element, a third message according to the first address to notify the first network function network element of to a subscription change of the service.

4. The method of claim 3, further comprising allocating, by the fourth network function network element a new subscription correlation identifier, wherein the third message further comprises the new subscription correlation identifier.

5. The method of claim 4, wherein the third message further comprises a subscription correlation identifier change event identifier.

6. The method of claim 1, wherein the first address is a notification endpoint of the first network function network element.

7. The method of claim 1, wherein the second network function network element is a first mobility management function network element and the fourth network function network element is a second mobility management function network element.

8. The method of claim 1, wherein the first network function network element is a unified data management network element.

9. The method of claim 1, wherein the third network function network element is a network exposure function network element.

10. An apparatus comprising:
a memory configured to store instructions; and
a processor coupled to the memory and configured to execute the instructions to cause the apparatus to:
receive, from a first network function network element, a first message requesting to subscribe to a service on behalf of a third network function network element, wherein the first message comprises a first address of the first network function network element and a second address of the third network function network element, wherein the first address is usable for sending, to the first network function network element, a second message notifying the first network function network element that a subscription of the service has changed, and wherein the second address is usable for sending the service to the third network function network element; and
send context information to a fourth network function network element when a network element serving a user equipment is handed over from the apparatus to the fourth network function network element,
wherein the context information comprises the first address and the second address.

11. The apparatus of claim 10, wherein the instructions further cause the apparatus to:
allocate a subscription correlation identifier; and
send the subscription correlation identifier to the first network function network element.

12. The apparatus of claim 10, wherein the first address is a notification endpoint of the first network function network element.

13. The apparatus of claim 10, wherein the apparatus is a mobility management function network element.

14. The apparatus of claim 10, wherein the fourth network function network element is a mobility management function network element.

15. The apparatus of claim 10, wherein the first network function network element is a unified data management network element.

16. The apparatus of claim 10, wherein the third network function network element is a network exposure function network element.

17. A computer program product comprising instructions for storage on a non-transitory medium and that, when executed by a processor, cause an apparatus to:
receive, from a first network function network element, a first message requesting to subscribe to a service on behalf of a third network function network element, wherein the first message comprises a first address of the first network function network element and a second address of the third network function network element, wherein the first address is usable for sending, to the first network function network element, a second message indicating that a subscription of the service has changed, and wherein the second address is usable for sending the service to the third network function network element; and send context information to a fourth network function network element when a network element serving a user equipment is handed over from the apparatus to the fourth network function network element,
wherein the context information comprises the first address and the second address.

18. The computer program product of claim 17, wherein the instructions further cause the apparatus to:
allocate a subscription correlation identifier; and
send the subscription correlation identifier to the first network function network element.

19. The computer program product of claim 17, wherein the first address is a notification endpoint of the first network function network element.

20. The computer program product of claim 17, wherein the first network function network element is a unified data management network element, wherein the apparatus is a mobility management function network element, wherein the third network function network element is a network exposure function network element, and wherein the fourth network function network element is another mobility management function network element.

* * * * *